(12) United States Patent
Frozenfar

(10) Patent No.: US 10,686,621 B1
(45) Date of Patent: Jun. 16, 2020

(54) APPARATUS FOR DIGITAL RF OVER GLASS

(71) Applicant: Sealight Technologies, Inc., Santa Clara, CA (US)

(72) Inventor: Moshe Frozenfar, Palo Alto, CA (US)

(73) Assignee: SEALIGHT TECHNOLOGIES, INC., Santa Clara, CA (US)

( * ) Notice: Subject to any disclaimer, the term of this patent is extended or adjusted under 35 U.S.C. 154(b) by 90 days.

(21) Appl. No.: 15/894,606

(22) Filed: Feb. 12, 2018

Related U.S. Application Data

(60) Provisional application No. 62/458,481, filed on Feb. 13, 2017.

(51) Int. Cl.
| | |
|---|---|
| *H04L 12/28* | (2006.01) |
| *H04L 12/18* | (2006.01) |
| *H04N 7/22* | (2006.01) |
| *H04L 12/851* | (2013.01) |
| *H04L 5/00* | (2006.01) |
| *H04L 12/709* | (2013.01) |
| *H04L 12/891* | (2013.01) |

(52) U.S. Cl.
CPC .......... *H04L 12/2838* (2013.01); *H04L 5/001* (2013.01); *H04L 12/185* (2013.01); *H04L 12/2801* (2013.01); *H04L 45/245* (2013.01); *H04L 47/2441* (2013.01); *H04L 47/41* (2013.01); *H04N 7/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,490,727 B1* | 12/2002 | Nazarathy | ........... | H04J 14/0226 348/E7.071 |
| 2004/0190544 A1* | 9/2004 | Azenko | ............... | H04L 12/2801 370/442 |
| 2015/0172072 A1* | 6/2015 | Rakib | ................. | H04L 12/2885 725/111 |
| 2015/0304042 A1* | 10/2015 | Schemmann | .... | H04B 10/25751 398/67 |

* cited by examiner

*Primary Examiner* — Justin T Van Roie
(74) *Attorney, Agent, or Firm* — North Shore Patents, P.C.; Michele Liu Baillie

(57) ABSTRACT

A system for digital aggregation of upstream traffic includes digital optical node units (DONUs), each assigned a corresponding timeslot and a corresponding frequency band for transmission of digital data. Each DONU converts a radio frequency burst into the corresponding intermediate frequency (IF) band and transmits the corresponding IF data onto one of the optical fiber spans at the corresponding timeslot to an optical passive splitter. The optical passive splitter receives the digital data from the DONUs without collision, combines the IF data from each of the DONUs into a combined digital data, and sends the combined digital data to the digital RFoG transceiver over a single span. The digital RFoG transceiver recovers IF data for each of the DONUs from the combined digital data, converts the IF data to RF data, combines plurality of RF data, converts the digital combined RF data to analog RF data and outputs the analog data to the network.

8 Claims, 20 Drawing Sheets

10,686,621 B1

APPARATUS FOR DIGITAL RF OVER GLASS

BACKGROUND OF THE INVENTION

Cable television (TV) systems utilize an architecture called Hybrid Fiber Coax (HFC), as illustrated in FIG. 1. The HFC architecture relies on a mixture of fiber optic technology and coaxial cable based transmission technology. The cable TV system is comprised of a central facility called a head-end office 1, where central equipment controlling much of the cable system resides, optical node 6, coaxial (coax) distribution network 7, and equipment at customer premises 8. The head-end office 1 can serve a very large number of customers, often an entire city or a metro area. The head-end office 1 uses fiber optic cables to cover long distances between its location and optical node locations. Fiber optic medium is well suited for this portion of the network due to its ability to propagate optical signals across long distances with small signal power losses. The coax portion of the network generally covers short distances due to its relatively high signal power losses. A network of radio frequency (RF) power amplifiers is used to boost the RF signals power along the coax distribution network 7 to provide uniform RF power levels across the covered area. HFC coaxial distribution network is a shared medium that is used simultaneously to carry both the upstream and the downstream signals by employing Frequency Division Multiplexing (FDM).

As illustrated in FIG. 2, a small portion of the lower frequency spectrum is typically assigned to the upstream channels (F1 to F2), followed by guard band (F2 to F3) and then followed by an upper frequency spectrum assigned to the downstream channels (F3 to F4). This frequency band splitting leads to a substantial asymmetry in the upstream versus the downstream frequency spectrum allocation, where the downstream frequency spectrum is many times wider than that of the upstream spectrum. Furthermore, the lower frequency spectrum is more susceptible to external noise ingress than the upper spectrum and therefore can only supports lower orders of Quadrature Amplitude Modulation (QAM), leading to lower overall data capacity efficiencies per channel.

The following are descriptions of signal flow from the head-end office 1 toward the customer premises 8, also referred to as "Downstream" signals, in a cable TV HFC system. Video feeds from various sources 12, such as satellite receivers, fiber optic cables or microwave links, are funneled at the head-end office 1 to a network of RF channel combiners 3. Internet data communications is managed by a central equipment called Cable Modem Termination System (CMTS) 12. The CMTS 12 bridges a large number of cable modems 109 at customer premises 8 and the Internet 13. This bridging function is achieved by broadcasting encrypted data and control packets to the connected cable modems 9 and allocating time slots for individual cable modems 9 to access the shared upstream path. The CMTS 12 features downstream RF ports, each connected to RF channel combiner 3. The combined video channels and CMTS data channels are then converted to optical signal by optical transmitters 4, and the optical signal is then launched into fiber optic cables 5 connecting the head-end office 1 with optical node 6. At the optical node 6, the optical downstream signal is converted to an electrical signal, amplified, and sent toward the customer premises 8 via the coax distribution network 7. At the customer premises 8, coaxial cables connect to a set top box 15 or directly to TV sets. The coaxial signal is also connected to the cable modem 9, where data packets destined for its specific customer are captured and sent to a computer 10 via a local computer port 14.

The following are description of the signal flow from the customer premises 8 toward the head-end office 1, also referred to as "Upstream" signals, in a cable TV HFC system. The upstream path resources are shared among a large number of customers, and therefore a critical role of the CMTS 12 is to dynamically allocate time slots and frequency channel/s for each customer premises equipment and thereby avoid collisions. Data packets generated by the customer's computer 10 are received by the cable modem 9 via its computer port 14. These RF modulated data packets, ultimately destined for the Internet 13, then are transmitted on the upstream channels of the coax distribution network 7 by the associated cable modem 9 on its allocated time slots and frequency channel/s. Upstream data signal traversing over the coax distribution network 7 are received by the optical node 6, converted to optical signal, and sent to the head-end office 1 via fiber optic link 5. At the head-end office 1, optical upstream signals containing data packets from numerous cable modems 9 are then converted to electrical signals via optical receiver 11 and delivered to the CMTS 12 upstream port. The upstream data packets are then processed by the CMTS 12, their destination address modified according to switching and routing tables, and then sent to the Internet 13.

FIG. 3 illustrates a cable TV Fiber to the Home (FTTH) system, where multiple customers receive their video signals and communicate with the Internet via cable modems. The cable TV FTTH system is comprised of the head-end office 1, fiber optic cables, small optical nodes 6 on the side of each customer building, and customer premises equipment. The head-end office 1 can serve a very large number of customers, often an entire city or a metro area. The head-end office 1 may also serve both HFC & FTTH customers. Cable TV FTTH systems rely on transporting a number of signals bidirectionally over a single fiber optic cable by employing a well-established technology called Wavelength Division Multiplexing (WDM), whereby each signal type is transmitted using a unique optical wavelength, also referred to as "color". Cable FTTH system places the optical node 6 physically very close to, or on the side of the customer building that it serves. This arrangement brings the fiber optic cable into or near the customer premises 8, and hence, this architecture is known as a Fiber To The Home (FTTH) system.

The following are descriptions of signal flow from the head-end 1 toward the customer premises 8, also referred to as "Downstream" signals, in a cable TV FTTH system. Video feeds 16 from various sources, such as satellite receivers, fiber optic cables or microwave links, are funneled at the head-end office 1 and optically transmitted on a specific wavelength λ1. Internet data communications is managed by a CMTS 12. The CMTS 12 bridges a large number of cable modems 9 at customer premises 8 and the Internet 13. This bridging function is achieved by broadcasting encrypted data and control packets to the connected cable modems 9 and allocating time slots for individual cable modems 9 to access the shared upstream path. The CMTS 12 features downstream RF ports, each connected to an optical transmitter 4 that converts the CMTS downstream signal to an optical signal with wavelength of λ2. The video channels and CMTS downstream data channels are then optically combined by optical combiner 19. A wavelength division multiplexer/de-multiplexer (WDM Mux/D-Mux) 17 then launches the combined downstream optical signals into long distance fiber optic cables 5 connecting the head-end office 1 with optical splitter 18. Optical splitter 18 is used to split the optical signal present on optical cable 5 into N number of optical signals, each connected to a specific FTTH optical node 6. Optical splitter 18 performs the opposite in the upstream direction, combining the optical signals transmitted by the various optical nodes 6 and launches the combined upstream optical signal into optical cable 5.

The optical node 6 at each customer premise 8 then converts optical signals to electrical signals in the downstream direction and converts the electrical signals into optical signals in the upstream direction. At the optical node 6, the optical downstream signal which contain both video channels and data channels is converted to an electrical signal, amplified, and sent toward the customer premises 8 via a coax cable. At the customer premises 8, the coax cable connects to a set top box or directly to a TV set for video reception. The coax signal is also connected to cable modem 9, where downstream data packets destined for its specific customer are captured and sent to a local computer port 14.

The following are description of the signal flow from the customer premises 8 toward the head-end office 1, also referred to as "Upstream" signals, in a cable TV FTTH system. The upstream path resources are shared among a large number of customers and therefore a critical role of the CMTS 12 is to dynamically allocate time slots for each customer premises equipment and thereby avoid collisions. Data packets generated by the customer's computer 10 are received by the cable modem 9 via its computer port 14. These data packets, ultimately destined for the Internet 13, are then transmitted on the upstream channels of the coax cable by the associated cable modem 9 on its allocated time slots. Upstream data signal traversing over the coax cable are then received by the optical node 6, converted to optical signal with wavelength λ3 and sent toward optical splitter 18, where the optical upstream signal is sent toward the head-end office 1 via fiber optic link 5. At the head-end office 1, optical upstream signals containing data packets from numerous cable modems 9 are demultiplexed by the Mux/D-Mux 17, converted to electrical signals via optical receiver 11, and delivered to the CMTS 12 upstream port. The upstream data packets are then processed by the CMTS 12, their destination address modified according to switching and routing tables, and sent to the Internet 13.

Coaxial cables incur major signal power losses and therefore require RF amplifiers dispersed throughout the coaxial distribution network 7 to amplify the RF signals, which leads to major equipment cost, continuous power consumption and lower overall reliability of the network 7. As illustrated in FIG. 4, by extending the fiber optical cable deeper into the network 7 and replacing RF amplifiers with optical nodes, the coaxial portion of the network 7 is substantially shortened. This leads to a network 20 that does not require RF amplifiers, smaller number of homes served by each optical node which translates to improved network reliability, reduced power consumption and higher bandwidth capacity per subscriber.

Extending the optical fiber deeper into the network 20 edge reduces or eliminates altogether RF amplifiers which enhances system capacity but at the same time increases the number of optical nodes substantially. As can be observed in FIG. 4, as the number of optical nodes 6 is increased, the number of optical spans connecting the optical nodes 6 to the head-end office 1 increases proportionally. Two existing techniques attempt to address upstream aggregation: optical node daisy chaining; and Radio Frequency over Glass (RFoG).

FIG. 5 illustrates a daisy chaining technique for upstream aggregation. In this technique, aggregation of the upstream channels from multiple optical nodes 6 at the edge of a fiber deep network 20 is accomplished by daisy chaining optical nodes using fiber optic, resulting with only the last optical node in the chain sending a single optical signal to the head-end office 1. This reduces the need and cost associated with increasing the long-haul portion of the optical transport connecting optical nodes 6 to the head-end office 1. However, prior art daisy chaining techniques present several disadvantages: single point of failure; complicated management; and noise funneling.

Daisy chain systems are very susceptible to a single point of failure since RF samples from optical nodes 6 must traverse through multiple other optical nodes 6A before reaching the optical receiver 11 at the head-end office 1. A failure in any optical node 6A in the chain, or a failure of any fiber span in the chain, will result in islands of optical node segments 6 that are disconnected from the optical receiver 11. The failure rate is directly proportional to the size of the daisy chain system, where an increase in the number of optical nodes and optical spans in the chain increases the likelihood of failure. This therefore limits the practical number of optical nodes that can be in the daisy chain system.

Daisy chain systems further have the disadvantage of requiring complicated management. Managing and monitoring large numbers of optical nodes 6 involve several processes, including the capability of the system to dynamically discover network topology, assign an address to each optical node, and establish resilient communications with each optical node even in the presence of common errors in the communication links. Daisy chained architecture requires complicated and often burdensome resources to achieve these basic management and monitoring tasks. Furthermore, in an event of equipment or plant failure, some or most monitoring functions cease to function at most inopportune times.

Daisy chain systems further have the disadvantage of noise Funneling. The digital summing of RF samples is not noiseless. Every time the number of nodes in a digital daisy chained system is doubled, the noise floor on the RF output of the system will be increased by 3 dB. This limits the practical number of optical nodes that can be in a daisy chain system.

FIG. 6 illustrates prior art Radio Frequency over Glass (RFoG) technique for upstream aggregation. RFoG aggregates the upstream channels from multiple optical nodes 6 at the edge of fiber deep network 20. A 1×N passive optical splitter 18 is used to connect multiple optical nodes to the head end office 1. To reduce noise funneling of multiple connected optical nodes, the optical nodes 6 are equipped with burst type analog laser transmitters. The laser on-board the optical nodes 6 are turned-on only during the duration that a RF signal generated by Customer Premises Equipment (CPE) is detected. As illustrated in FIG. 7, these RF burst signals are composed of a preamble section 21 followed by modulated data sections 22. Furthermore, the preamble section 21 of the burst is shaped in a way that resembles function of sin x/x. This signal shaping is essential to allow rapid signal locking by the burst receiver circuit of the CMTS 12 or other burst QAM receivers. The RFoG technique, however, presents several disadvantages: loss of preamble; limited number of optical nodes; lower upstream link performance; and optical beating interference.

RF burst detection circuit in the optical node 6 is programmed to define "Start of Burst" only after the level of RF signal reaches certain predetermined amplitude (threshold) and the burst duration is longer than predetermined period. As illustrated in FIG. 8, this leads to a delay from the start of the RF burst to turning-on the laser. Once the laser is turned-on, additional delay occurs until the laser reaches its full power. Because of these delays some portion of the preamble signal is lost. The partial loss of preamble section 21 can lead to malfunction at the burst receiver at the CMTS 12, and therefore, RFoG systems must use longer preamble fields to compensate. This results in a lower throughput of the system.

The RFoG technique further has the disadvantage of limiting the practical number of optical nodes. RFoG type optical nodes include an analog laser that converts the detected upstream RF burst to optical bursts destined to reach the head-end office 1. Laser turn-on time delay is a function of multiple parameters, among them laser optical power output at "off state". The lower the optical power at "off state" the longer it takes for the laser to turn on. One method to reduce laser turn-on time is by not turning the laser off completely when no RF signal is present. The downside of this method is injection of unmodulated light into the fiber cable between RF bursts. Accumulation of this un-modulate light generated by connected optical node will eventually leads to saturation of the upstream optical receiver and hence limits the practical maximum number of optical nodes in a RFoG system.

The RFoG technique further has the disadvantage of lower upstream link performance. RFoG optical nodes rely on Amplitude Modulated analog laser for the upstream path. The performance of AM modulated optical transmission systems varies with temperature changes, link distances and laser diode analog performance. The net result of these dependencies is lower overall performance and reduced throughput of the upstream channel.

The RFoG technique further has the disadvantage of optical beating interference. Optical Beating Interference (OBI) is a phenomenon that can occur if multiple optical nodes burst at the same time and their wavelengths are close to each other. The likelihood of OBI increases as the number of optical nodes is increased and whenever upstream traffic generated by CPE units is increased. Existing techniques have attempted to mitigate OBI by deploying two methods. The first method relies on lasers with adjustable wavelength while the second method relies on replacing passive optical splitter with an active splitter. However, with the first method, adjusting the wavelength of each laser in a system limits the maximum number of optical nodes to available wavelength slots that are far apart enough so as not to cause OBI, and thereby essentially limiting the practical number of optical nodes in a system. With the second method, an active splitter entails the use of dedicated optical-to-electrical (OE) conversion hardware for each optical node upstream path. However, every analog OE converter also generates thermal noise that it is added to the converted signal. Accumulation of thermal noise contributed by each OE converter stage essentially limits the maximum number of R-ONU units. FIG. 9 illustrates a RFoG system where the passive 1X N optical splitter 19 has been replaced with 1×N active splitter 23, avoiding OBI by terminating every optical node with an active port and combining the resulting upstream RF signals with analog RF combiners.

The RFoG technique further has the disadvantage of a lack of a management facility. RFoG systems treat the optical nodes as "dumb" devices and therefore do not provide any facilities to manage, monitor or control these optical nodes. This leads to lack of visibility into major parts of the cable TV systems where optical nodes account for most of the active devices in a RFoG network. Furthermore, lack of management facilities leads to lack of means to program the optical nodes and therefore all RF and optical parameters in the optical nodes are hard coded and inflexible. Anytime a different burst detection profile is desired, all optical nodes must be replaced with units that have the new parameters hard coded in their circuitry.

BRIEF SUMMARY OF THE INVENTION

Disclosed herein is a system for digital aggregation of upstream traffic in a network as specified in the independent claims. Embodiments of the present invention are given in the dependent claims. Embodiments of the present invention can be freely combined with each other if they are not mutually exclusive.

According to one embodiment of the present invention, a system for digital aggregation of upstream traffic in a network includes a plurality of digital optical node units coupled to a customer distribution network and a plurality of optical fiber spans coupled to the plurality of digital optical node units. Each digital optical node unit of the plurality of digital optical node units is assigned a corresponding timeslot and a corresponding frequency band for transmission of digital upstream data. Each DONU converts a radio frequency burst into the corresponding frequency band, converts the corresponding frequency band to a corresponding intermediate frequency (IF) data; and transmits the corresponding IF data onto one of the optical fiber spans at the corresponding timeslot to an optical passive splitter. The optical passive splitter receives the corresponding IF data from each of the plurality of digital optical node units over the plurality of optical fiber spans without collision. The optical passive splitter combines the corresponding IF data from each of the plurality of digital optical node units into a combined upstream digital data and sends the combined upstream digital data to a digital radio frequency over glass (RFoG) transceiver over a single span. The digital RFoG transceiver receives the combined upstream digital data from the optical passive splitter, recovers the IF data for each of the plurality of digital optical node units, processes each of the recovered upstream digital data, up converts each of the IF data to its RF frequency, converts the combined RF data to analog data, and outputs the analog data to the network.

In one aspect of the invention, the plurality of digital optical node units are further assigned a corresponding wavelength for the transmission of the data. The system further includes a single wavelength division multiplexing (WDM) access fiber coupled to the optical passive splitter and a wavelength division multiplexer and de-multiplexer (WDM Mux/De-Mux) coupled to the optical passive splitter via the single WDM access fiber and to the digital RFoG transceiver.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
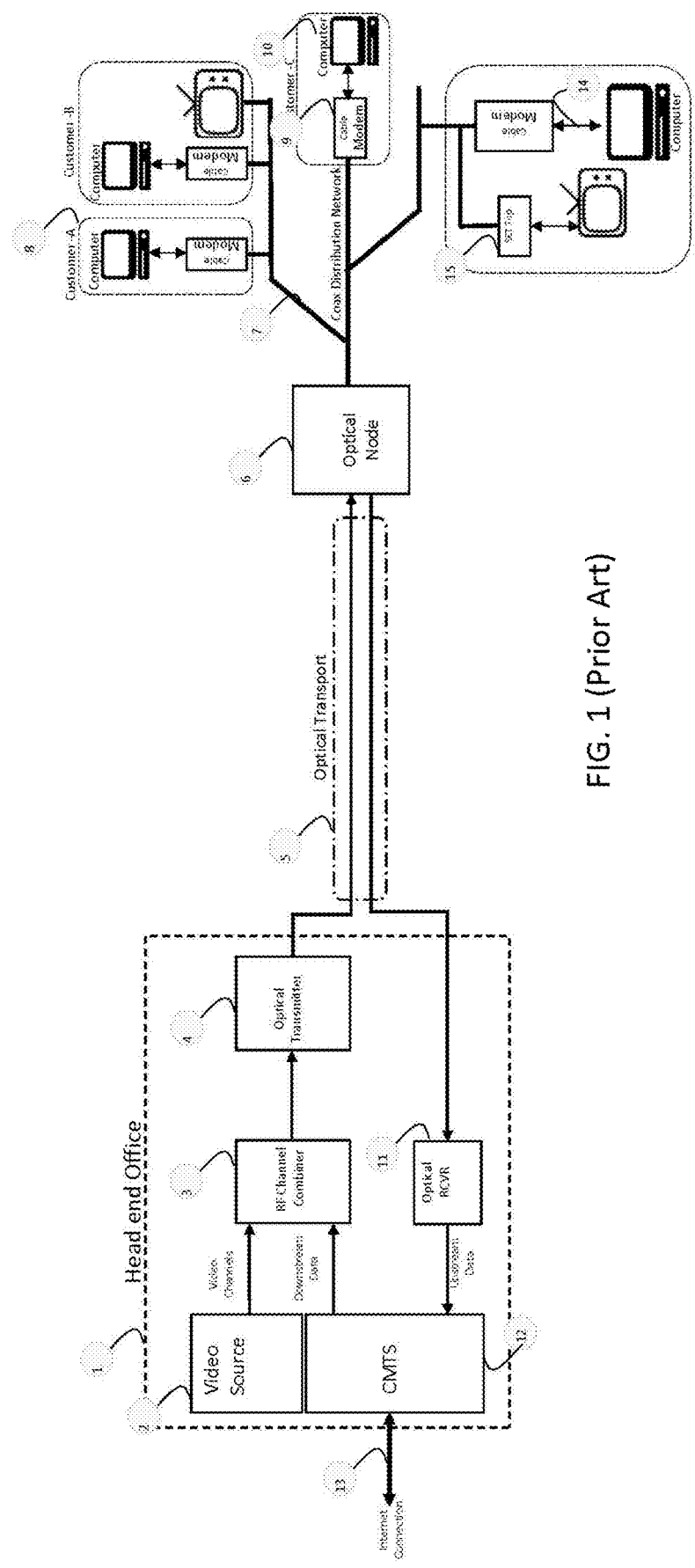
FIG. 1 illustrates a conventional cable television system utilizing a Hybrid Fiber Coax (HFC) architecture.
Figure 2:
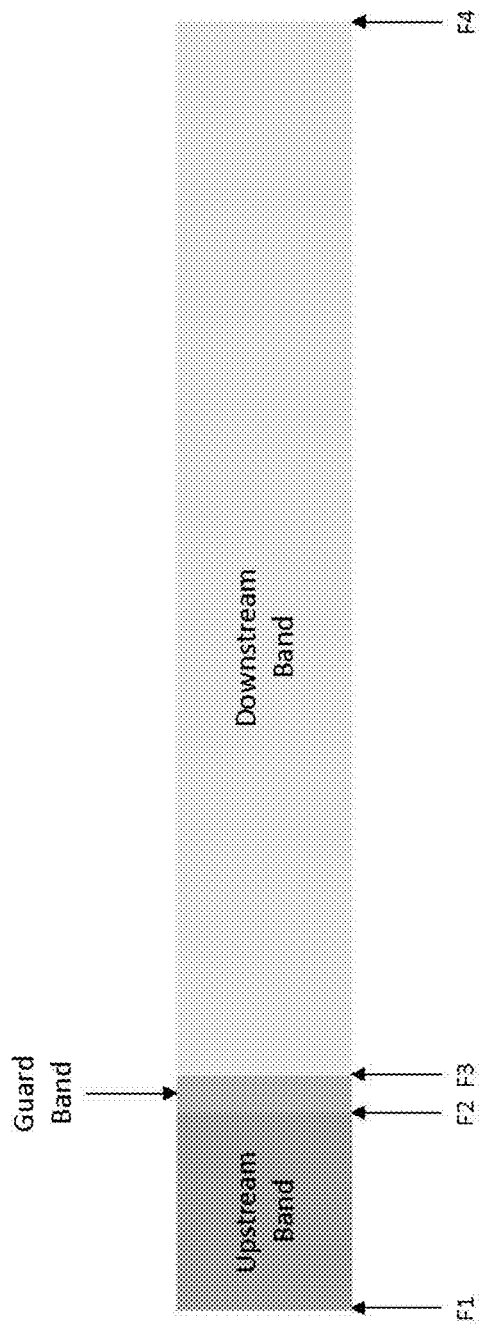
FIG. 2 illustrates a conventional frequency spectrum used in the cable television system.
Figure 3:
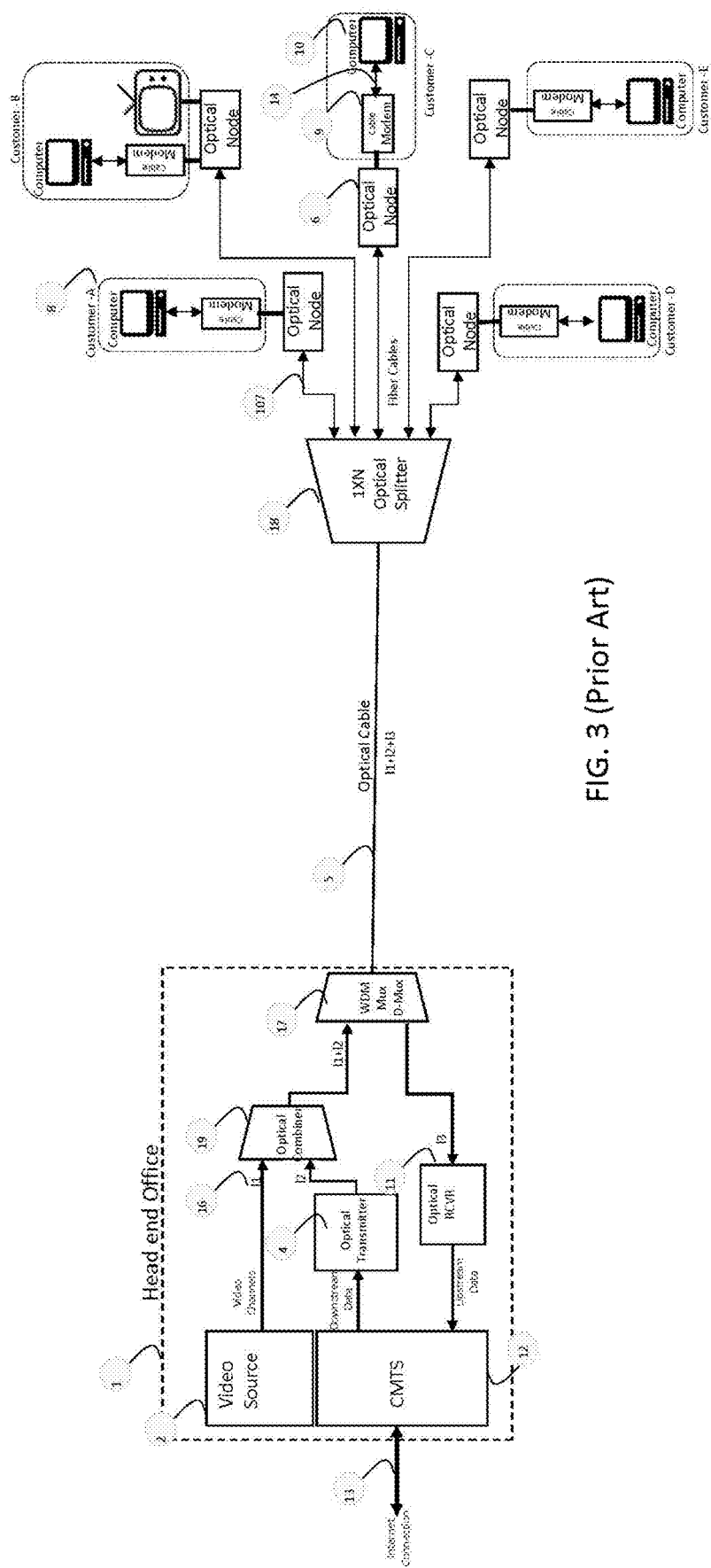
FIG. 3 illustrates another conventional cable television system utilizing a Fiber to the Home (FTTH) architecture.
Figure 4:
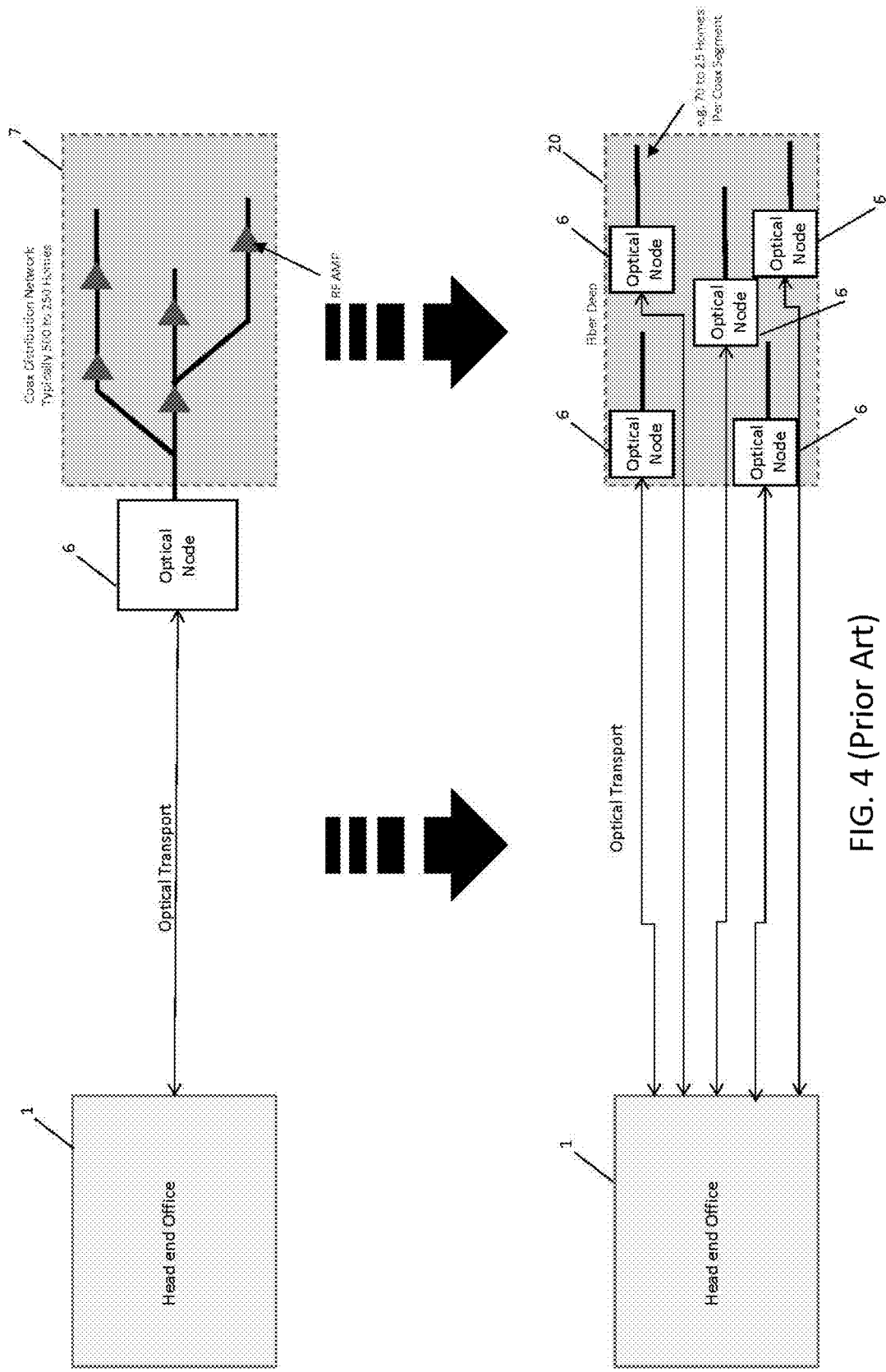
FIG. 4 further illustrates a conventional cable television system utilizing the HFC and Fiber Deep architectures.
Figure 5:
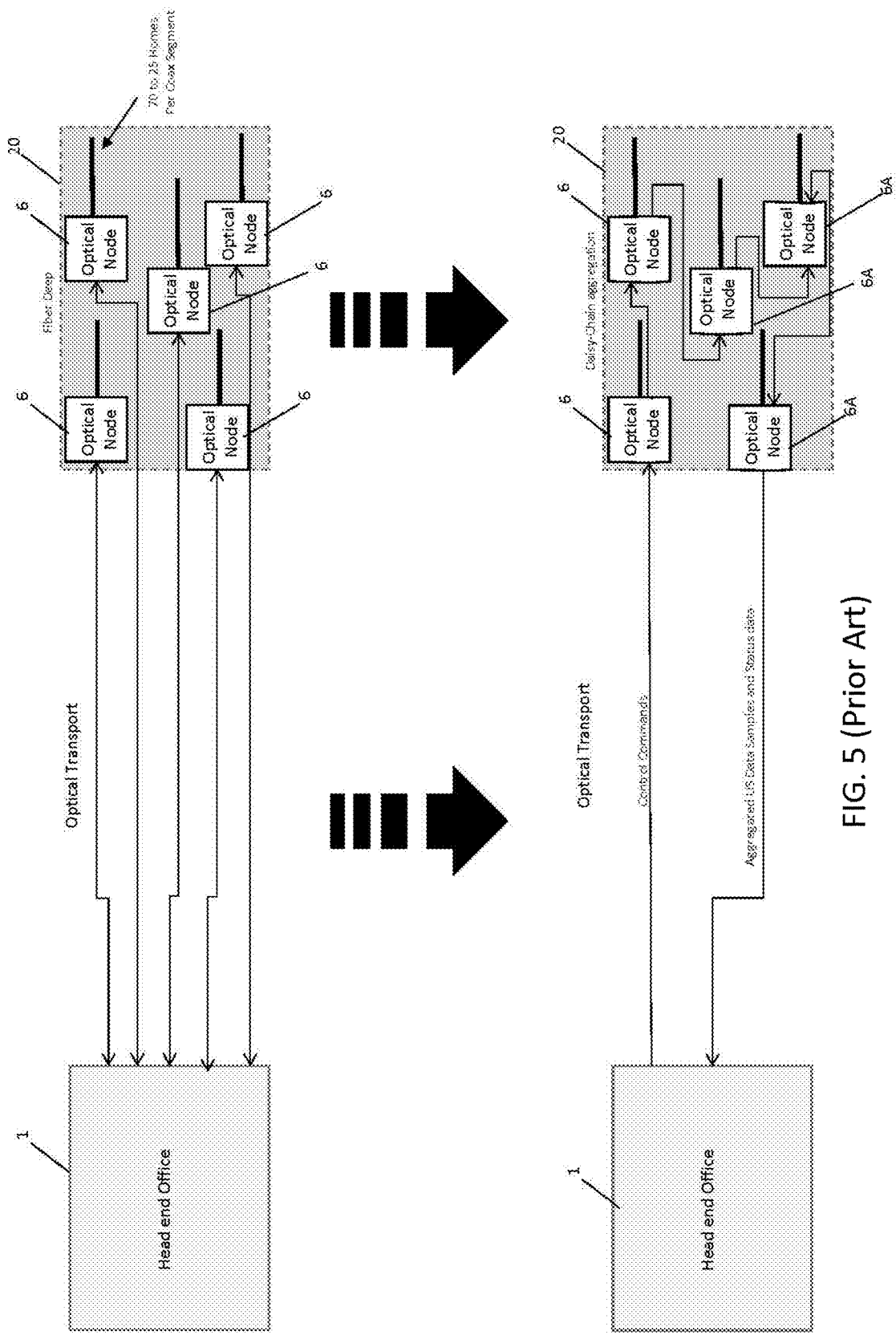
FIG. 5 illustrates a conventional daisy chaining technique for upstream aggregation.
Figure 6:
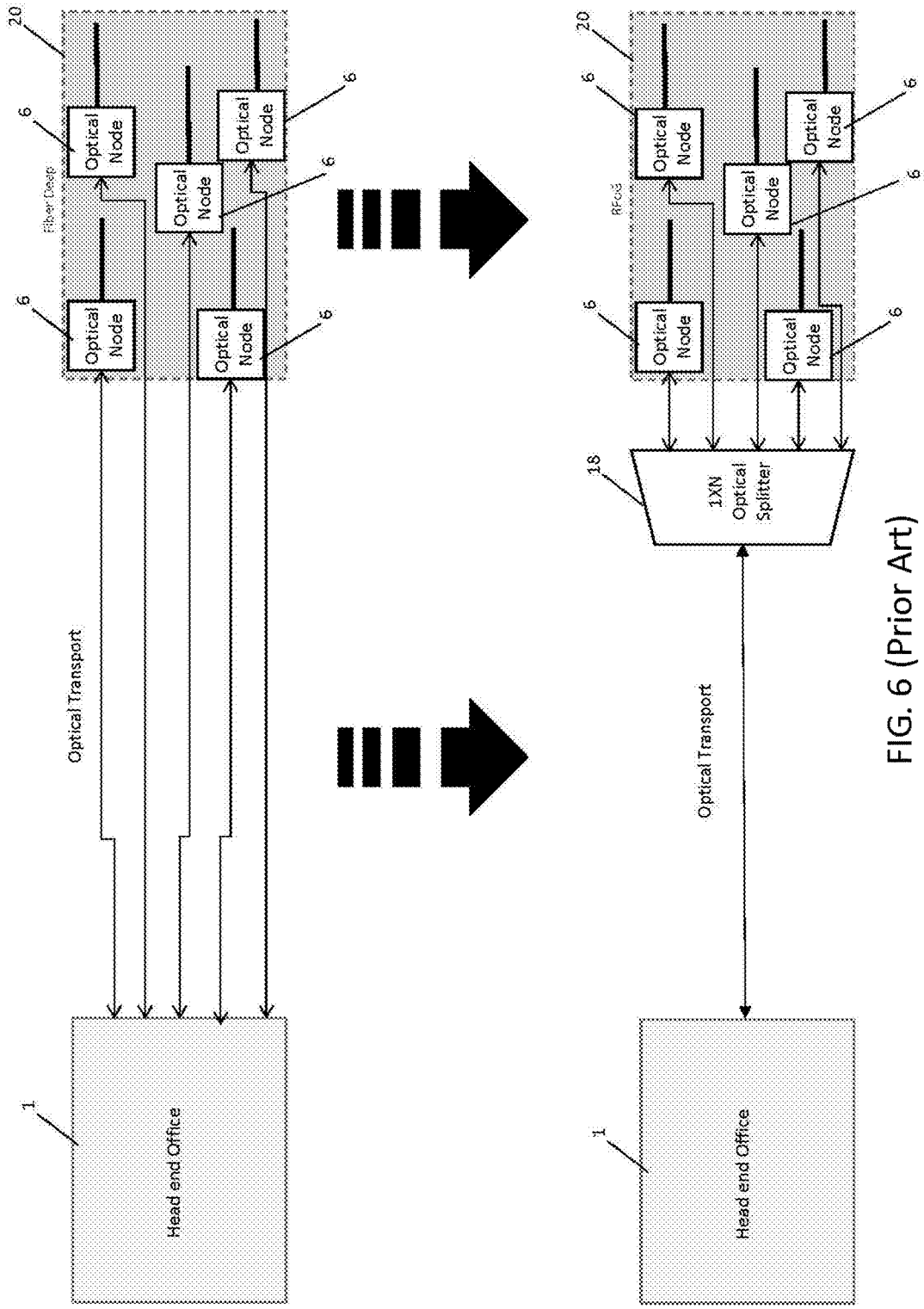
FIG. 6 illustrates a Radio Frequency over Glass (RFoG) technique for upstream aggregation.
Figure 7:
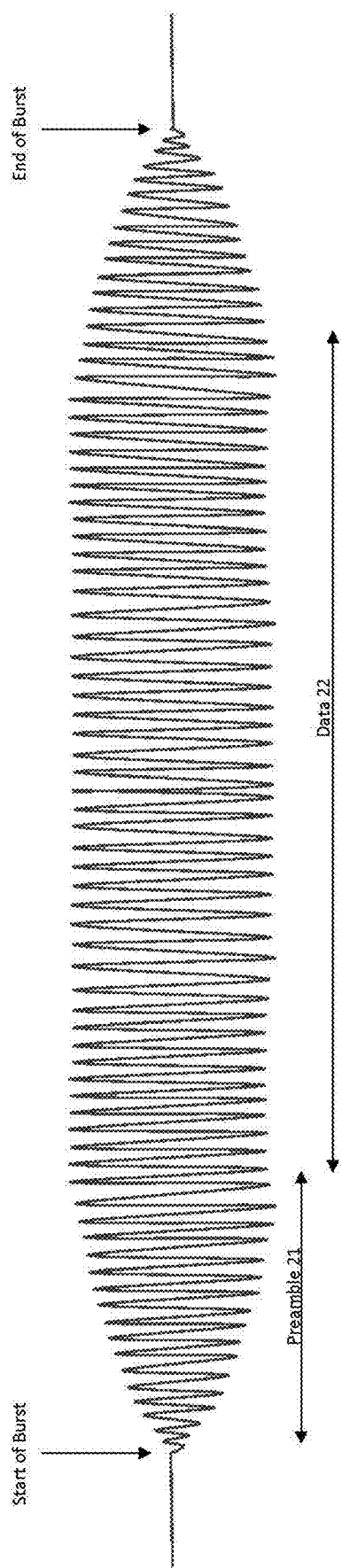
FIG. 7 illustrates a conventional Radio Frequency (RF) burst signal.
Figure 8:
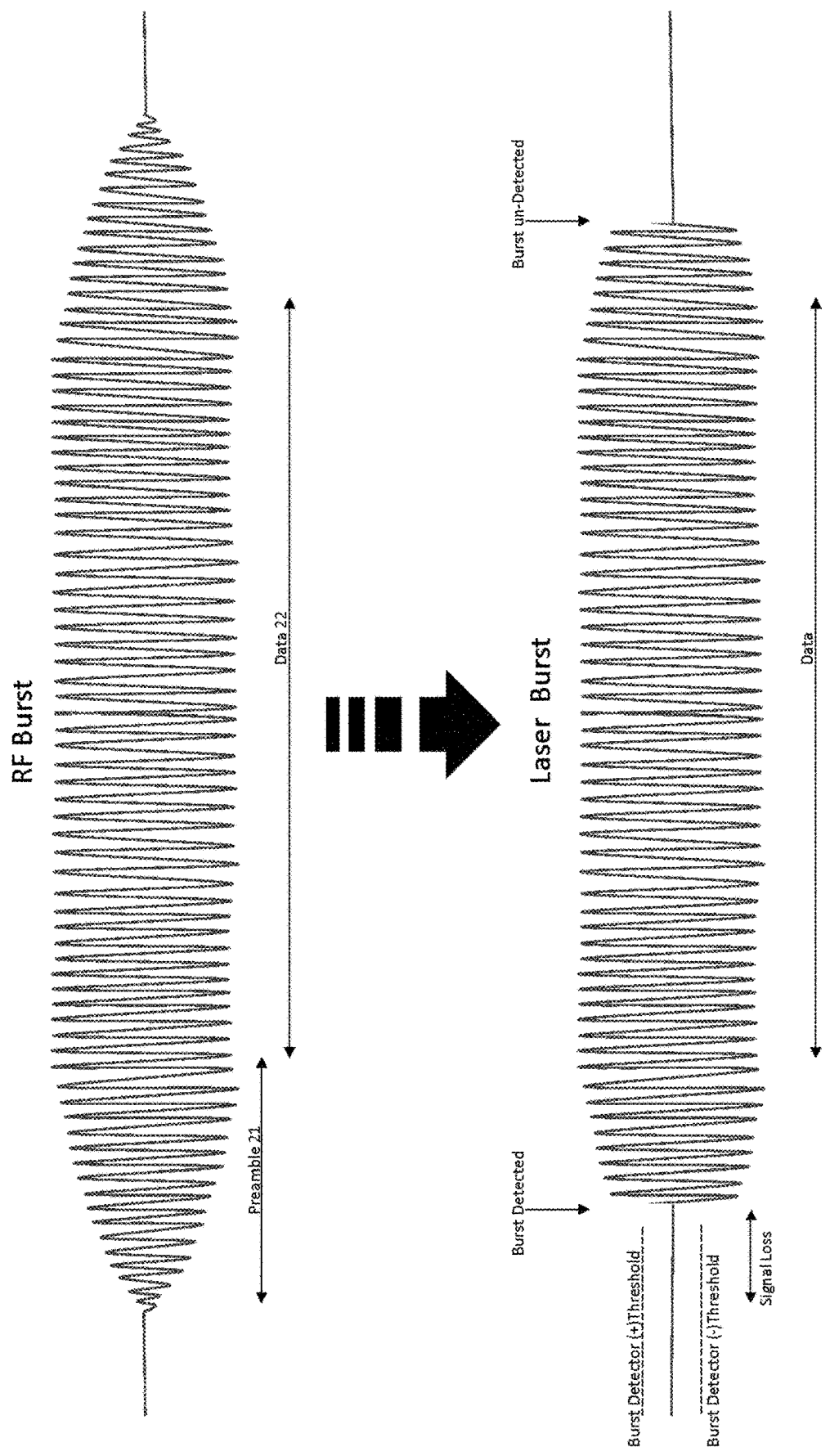
FIG. 8 illustrates signal loss in the conventional RF burst signal due to analog lasers at the optical node.
Figure 9:
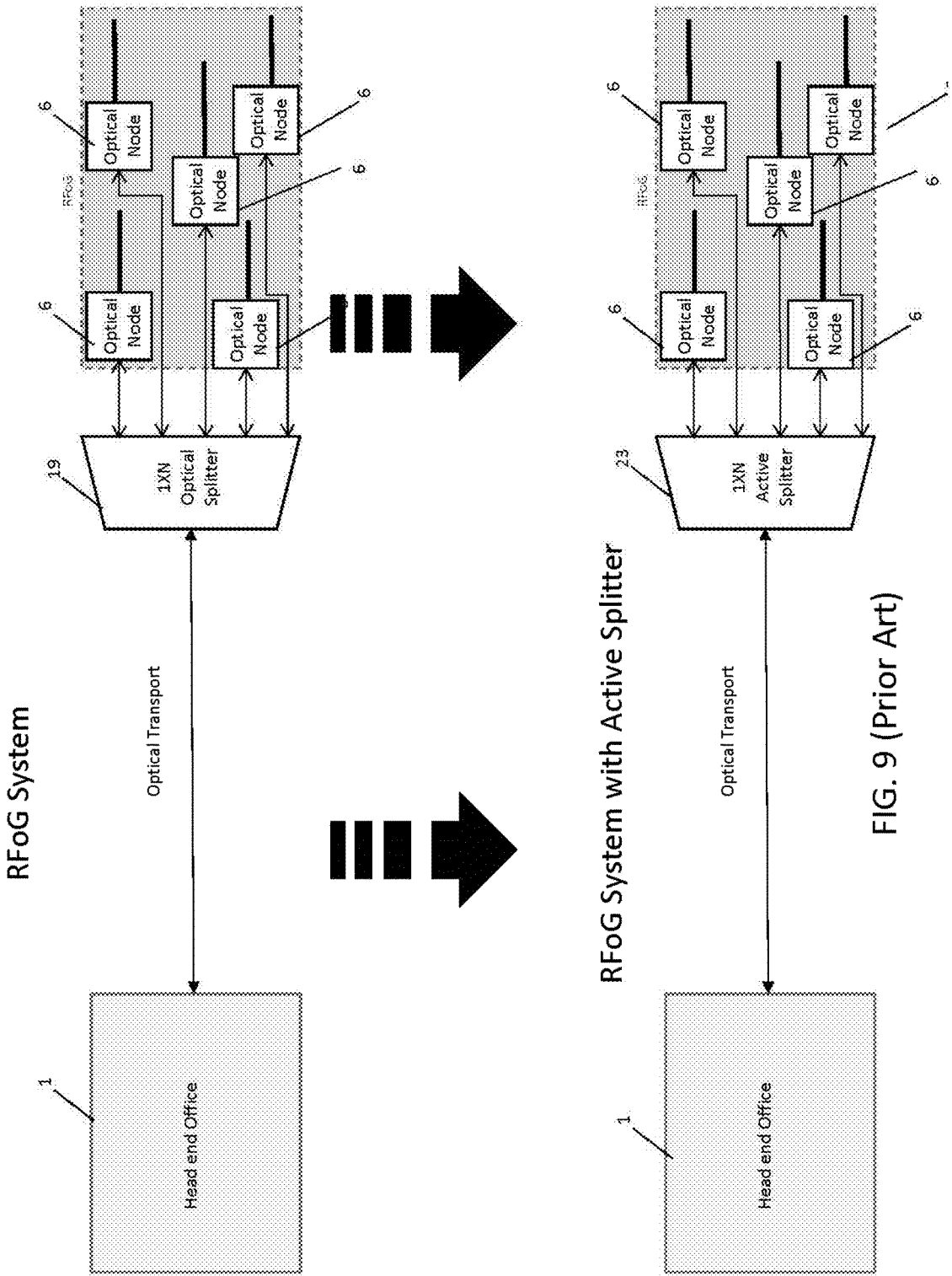
FIG. 9 illustrates optical beating interference in a conventional RFoG system.
Figure 10A:
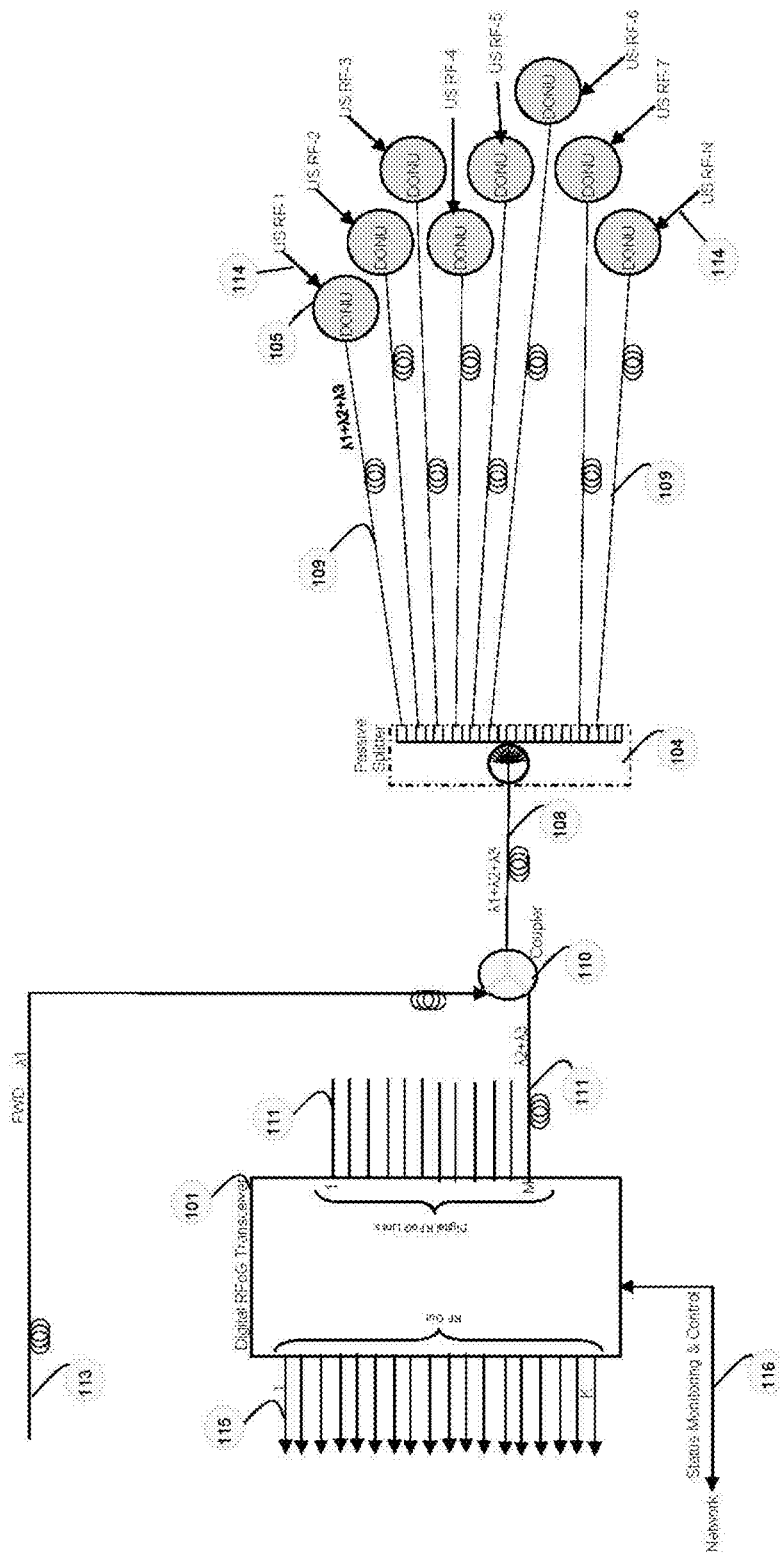
FIG. 10A illustrates an exemplary embodiment of a system for digital aggregation of upstream traffic for RFoG according to the invention.

FIGS. 1-15 uses the following reference numerals:
1 Head-End Office
2 Video Sources
3 Radio Frequency Combiner
4 Optical transmitters
5 Fiber Optic Cables
6 Optical Node
6A Optical Node
7 Coax Distribution Network
8 Customer Premises
9 Cable Modems
10 Computer
11 Optical Receiver
12 Cable Modem Terminal System (CMTS)
13 Internet
14 Local Computer Port
15 Set Top Box
16 Video Feeds
17 Wavelength Division Multiplexer/De-Multiplexer (WDM Mux/D-Mux)
18 1×N Optical Splitter
19 Optical Combiner
20 Fiber Deep Network
21 Preamble Section of RF Burst Signal
22 Data Sections of RF Burst Signal
23 1×N Active Splitter
30 Data Sampling Section
31 Digital Signal Processing (DSP) Sampling Section
32 Time Division Multiplexing (TDM) Section
33 Bandpass Filter
34 Down Converter Stage
35 IFx Burst Detect Stage
36 IFx First In First out (FIFO) Memory Stage
101 Digital RFoG Transceiver
102 Serializer
103 Laser Diode
104 Passive Optical Splitter
105 Digital RFoG ONU
106 Photo Detector
107 De-Serializer
108 Digital Fiber Trunk
109 Digital Fiber Branch
110 Optical Coupler
111 Bidirectional Digital Link
113 Forward Signal
114 Upstream RF Input
115 Analog RF Out
116 Management Link
207 Forward Optical Signal 209 Fiber Span
212 Management Link
215 Digital Return Link Input
217 RF Output
301 WDM Multiplexer/DE-Multiplexer in Digital Optical Node Unit
302 WDM Access Fiber
303 ADC Digital Data
304 Variable Band-pass Filter
305 Band Limited RF Digital data
306 Frequency Down Converter
307 IF Digital Data
308 RF Signal Measurement DSP
309 FIFO Memory
310 Burst-ON Signal
311 RF Detect Parameter Memory
312 RF Signal Level Control
313 Digital IF Burst Data
314 Time Division Multiplexer
315 Preamble Code
316 Messaging Data
317 Bursty TDM Data
318 IF Burst Processor
401 WDM Multiplexer/De-Multiplexer in Digital RFoG Transceiver
406 Impedance Matching Circuit
407 Analog Trans-Impedance Amplifier
408 Variable Gain Amplifier
409 Amplifier
410 Transformer
411 Frequency Tilt Compensator
412 Forward RF Signal
413 Coax Distribution Cable
414 Diplexer
415 Forward Feedback
416 Clock Detector
417 Temperature Compensation
418 RF Burst Detector
419 Automatic Gain Control
420 Received Optical Power Level Indicator
421 Control Bus
422 Master Clock
423 Received Optical Power Sense
424 Temperature Sensor
425 Optical Node Controller
426 Antenna
427 GPS Receiver
432 Phased Locked Loop
433 Sampling Clock
434 Analog to Digital Converter
435 Anti-Aliasing Filter
436 Control Bus-3
439 Control Bus-4
440 Variable Band-pass Filter
442 Upstream RF Signal
445 Laser on/off Control
502 Fiber Amplifier
504 RF Optical Forward Signal
505 Digital Upstream Link
507 Digital Optical Forward Signal
510 Serial Transmitter
511 Optical Port Receiver
516 Burst Receiver
521 management Processor
604 Optical Power Coupler
605 Combined RF and Digital Forward
618 WDM DE-MUX
620 WDM multiplexer/de-multiplexer
621 WDM Upstream Optical Signal
701 Aggregated digital upstream data
702 Upstream digital RF TDM multiplexer
706 TDM MUX
712 Digitized RF sample data
713 Digitized Upstream Data
714 De-Multiplexer
715 FIFO
716 RF Signal Power Measurement
717 RF Detect Parameters Memory
718 Burst Processor-1
719 Digital Switch
731 Data DE-Multiplexer
733 Burst Processor-K
736 TDM Aggregated digital upstream data
750 Variable bandpass Filter
751 Filtered RF Data
752 RF Power Detector
753 RF Power Level
754 RF Signal Measurement Processor
755 RF detect Parameters
757 FIFO Pointer Control Bus
802 RF Data Converter
805 DAC
806 Digital RFoG Transceiver Controller
815 RF filter
816 TDM De-Multiplexer FIG. 10A illustrates an exemplary embodiment of a system for digital aggregation of upstream traffic for RFoG according to the invention. The system includes a plurality of digital RFoG optical node units (DONU) 105, each having a span 109 that connects its respective DONU with an optical passive splitter 104. Each DONU 105 internally samples its upstream RF input 114 and converts the RF data to bursty TDM based serial high-speed digital data format. Each of the plurality of DONUs 105 transmits their converted RF data to the digital RFoG transceiver 101 via optical passive splitter 104. Optical passive splitter 104 is used to combine the digital upstream data transmitted by the DONUs 105. The combined upstream data is transmitted toward the digital RFoG transceiver 101 via span 108. Collision between different DONU 105 transmissions are avoided by employing a combination of a frequency division multiplexing (FDM) to time division multiplexing (TDM) conversion technique and a Data Over Cable Service Interface Specification (DOCSIS) time division multiple access (TDMA) control technique. These two techniques will be discussed in more detail further below.

Digital RFoG transceiver 101 receives and transmits serial data over bidirectional digital link 111. In the forward direction (toward DONUs 105, using wavelength λ3), digital RFoG transceiver 101 transmits a serial data that contains clock, frame and messaging information. Clock and frame information is used by DONUs 105 to synchronize their internal phased locked loop (PLL) and frame using wavelength λ3. The messaging information is used by digital RFoG transceiver 101 to pass configuration data, control data, and ranging data to each connected DONU 105.

In the reverse direction (toward digital RFoG transceiver 101), DONUs 105 send bursty serial data that contain digital radio frequency (RF) data, status monitoring data, and registration request data using wavelength λ2.

Digital RFoG transceiver 101 receives bursty serial data transmitted by the plurality of connected DONUs 105, recovers intermediate frequency (IF) data samples, status monitoring data and registration request data. Digital RFoG transceiver 101 further processes the received IF data, upconverts it into analog RF format and outputs the resulting analog RF data over one of its analog RF output 115 ports.

In order to avoid upstream transmission collision between the DONUs 105, ranging is necessary. Digital RFoG transceiver 101 periodically sends ranging request message to each connected DONU 105, measures the Round Trip Delay (RTD), processes collected RTD data for each DONU 105, and transmits frame position correction to each connected DONU 105.

Management link 116 is used by a remote status monitoring and controller server (not shown) to configure and monitor the digital RFoG transceiver 101 and the plurality of DONUs 105 connected to it. The remote server, through link 116, configures various system related parameters, such as list of upstream RF frequencies and their bandwidth, time slot assignment per frequency, data conversion parameters, Variable Gain Amplifier (VGA) gain settings, band pass filter settings, and a list of DONU media access control (MAC) addresses.

Optionally, multi upstream/downstream frequency Split ratio operations of the connected DONUs 105 are enabled. Each connected DONU 105 served by the digital RFoG transceiver 101 can be configured for a different upstream RF bandwidth. For example, a first DONU 105 can be configured for 5 MHz-42 MHz, a second DONU 105 can be configured for 5 MHz-85 MHz, and a third DONU 105 can be configured for 5 MHz-204 MHz. The digital RFoG transceiver 101 would set the system time slot parameters to accommodate the widest upstream RF band. For the example given above, the time slot parameters would be set for all connected DONUs 105 to cover 5-204 MHz. The first DONU 105 configured for 5-42 MHz would only sample the 5-42 MHz band and therefore access only the 5-42 MHz related time slots. However, the first DONU 105 burst digital serial upstream link would operate at the rate set for 5-204 MHz band.

Figure 10B:
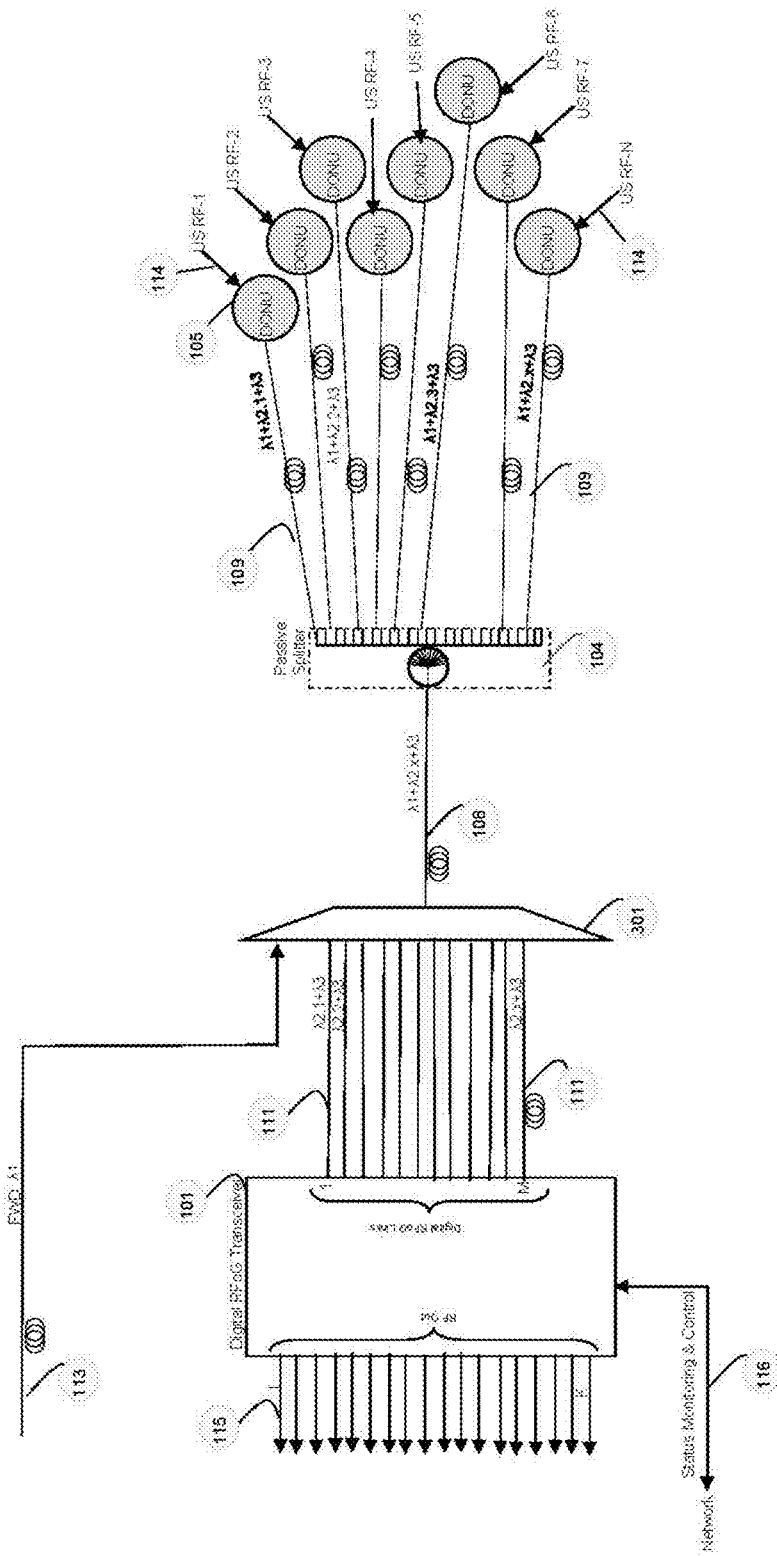
FIG. 10B illustrates a second exemplary embodiment of a system for digital aggregation of upstream traffic for RFoG according to the invention.

FIG. 10B illustrates a second exemplary embodiment of a system for digital aggregation of upstream traffic for RFoG according to the invention. In this embodiment, each group of DONUs 105 are transmitting their upstream data on a different wavelength, such as $\lambda 2.1$ through $\lambda 2.x$. Since the transmission of each group of DONUs 105 is on a different wavelength, passive wave division multiplexing & de-multiplexing is possible. This arrangement allows the use of a single span 108 to carry the upstream data traffic from multiple groups of DONU 105 without any interference between the groups.

Optical passive splitter 104 is used to combine the digital upstream data transmitted by multiple groups of DONU 105 over wavelengths $\lambda 2.1$ through $\lambda 2.x$. The optical passive splitter 104 transmits the combined upstream data toward the digital RFoG transceiver 101 via span 108 and couples the combined forward wavelengths toward the connected DONUs 105.

The DONU 105 is described further below with reference to FIGS. 12A-12C. The digital RFoG transceiver 101 is described further below with reference to FIGS. 14A-14B.

Figure 11:
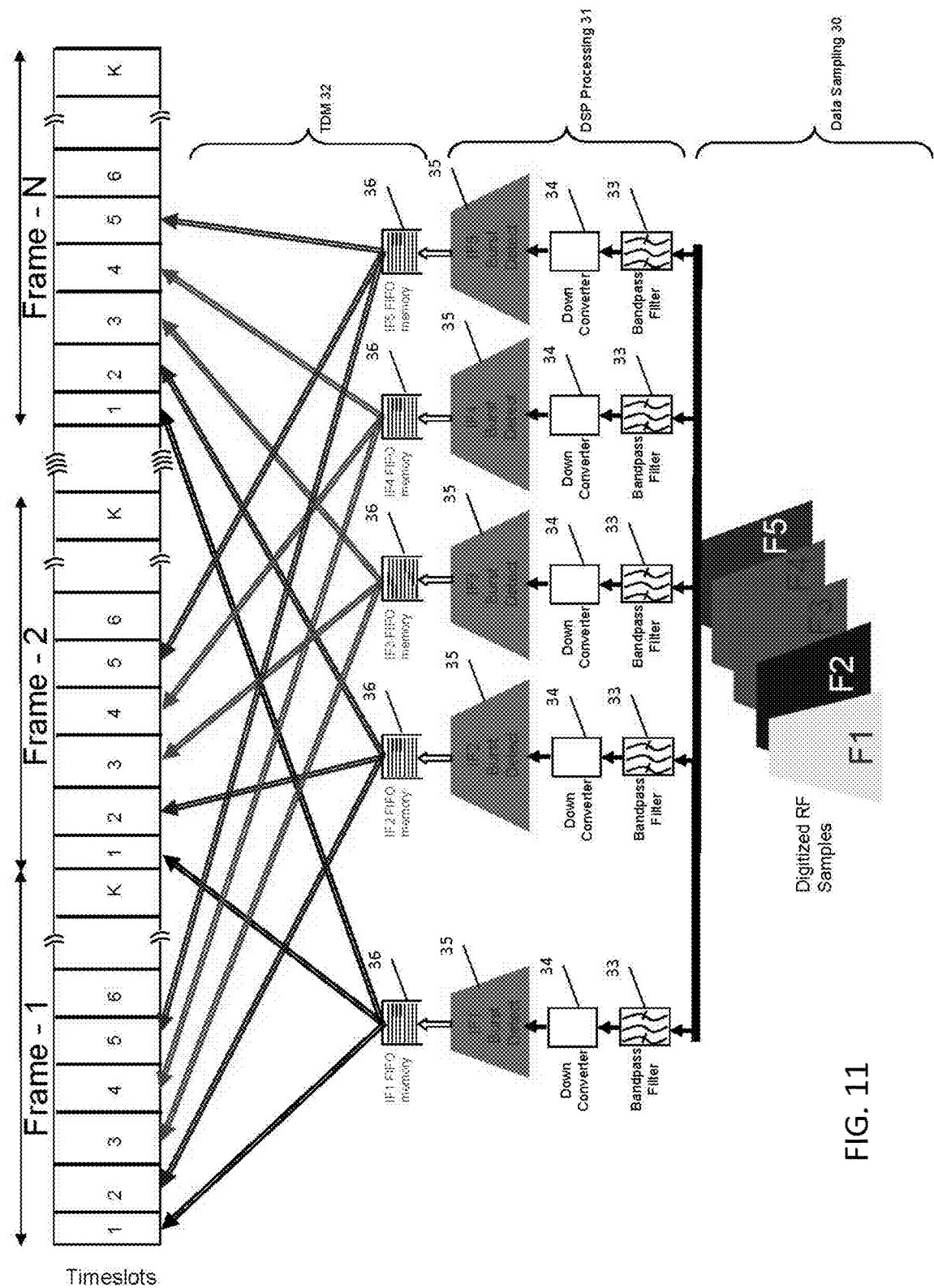
FIG. 11 illustrates FDM to TDM conversion performed by the exemplary embodiments of the system for aggregation of upstream traffic according to the invention.

FIG. 11 illustrates FDM to TDM conversion performed by the exemplary embodiments of the system for aggregation of upstream traffic according to the invention. DOCSIS uses a combination of FDM and TDMA for avoiding collision on the upstream path while allowing cable modems to transmit multiple data streams simultaneously. here, for any given frequency, only one cable modem transmits at a given time. With DOCSIS TDMA, the channel is sliced into small times lots, called "minislots". The Cable Modem Termination System (CMTS) 12 assigns minislots to cable modems based on a number of variables, including cable modem buffer fill state. By giving a cable modem more or fewer minislots, the CMTS 12 can control exactly how much upstream bandwidth each cable modem has access to. In this exemplary embodiment, pre-knowledge of the minislot assignment schedule by the CMTS 12 is not assumed. Instead, the system "learns" the minislot assignment by segregating the upstream spectrum into a predetermined number of frequency bands and monitoring RF carrier amplitude on each frequency band.

In the data sampling section 30, a group of frequency bands F1 through F5 have been preconfigured by a system operator. Each frequency band is determined by its center frequency and its bandwidth. As described above, only one cable modem will burst at a given time on a given frequency band.

In the DSP processing section 31, a specific band pass filter 33, each for a specific frequency band, is used to filter out frequencies outside of the desired frequency band. The band pass filters 33 are followed by a frequency specific down converter stage 34 that is used to convert the selected RF frequency band to an Intermediate Frequency (IF). The IF data then is processed by an IFx Burst Detect stage 35. The IF burst detection is further below with reference to FIG. 13. The IFx First In First Out (FIFO) Memory stage 36 is used to buffer IF data, and when a data burst in the IF data is detected, the IF samples that have been stored in the FIFO memory are sent out on the appropriate time slot, as illustrated in the TDM section 32. Each frame is configured to carry K number of time slots, with each time slot having bandwidth that is proportional to its assigned RF frequency bandwidth. The wider the frequency bandwidth (frequency domain) is configured, the wider the corresponding time slot (Time domain) will be. Since the IF data is sent according to the assigned timeslots, no collision in their transmission occurs.

Figure 12A:
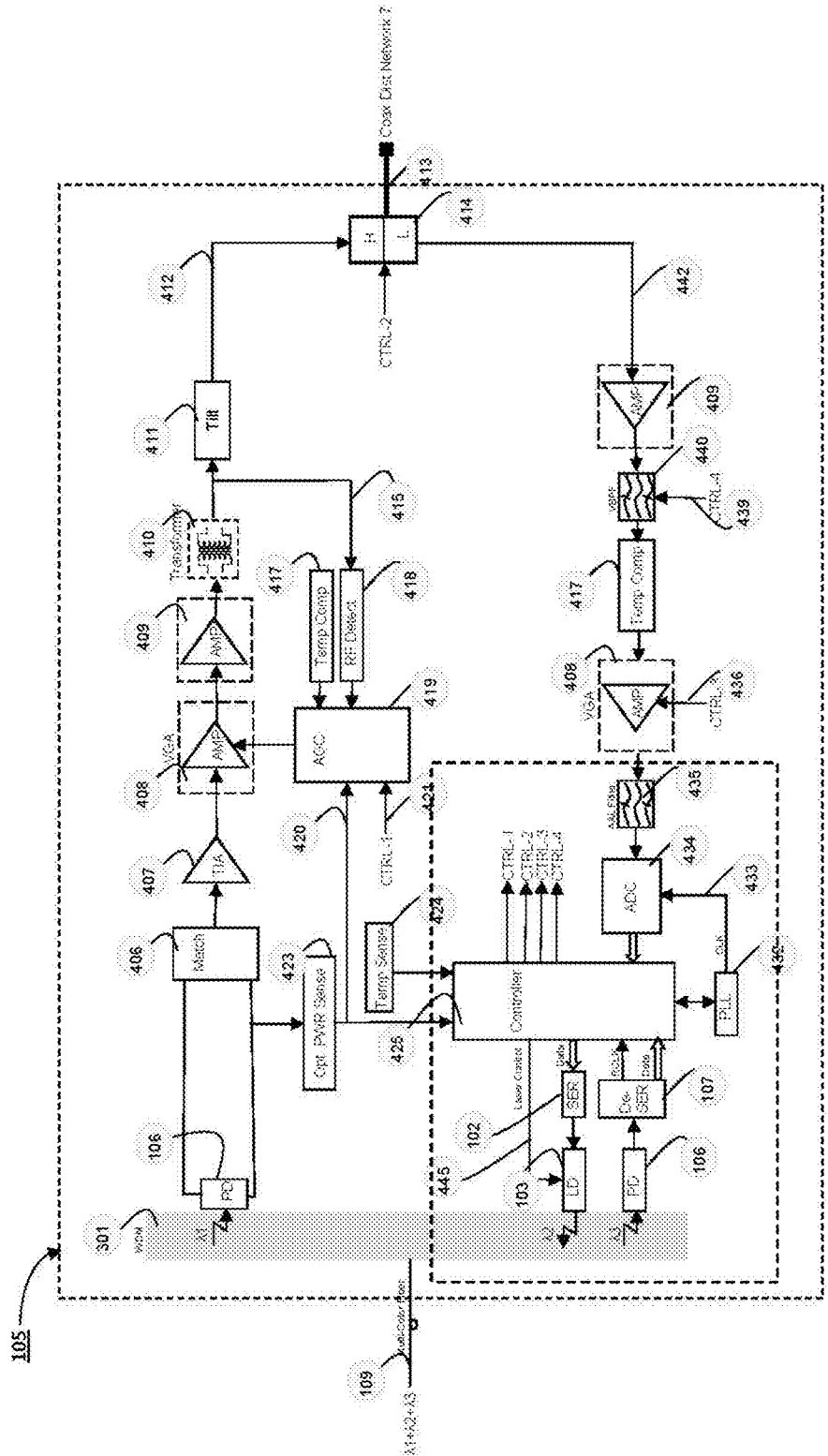
FIG. 12A illustrates a first exemplary embodiment of the DONU 105 according to the invention.
Figure 12B:
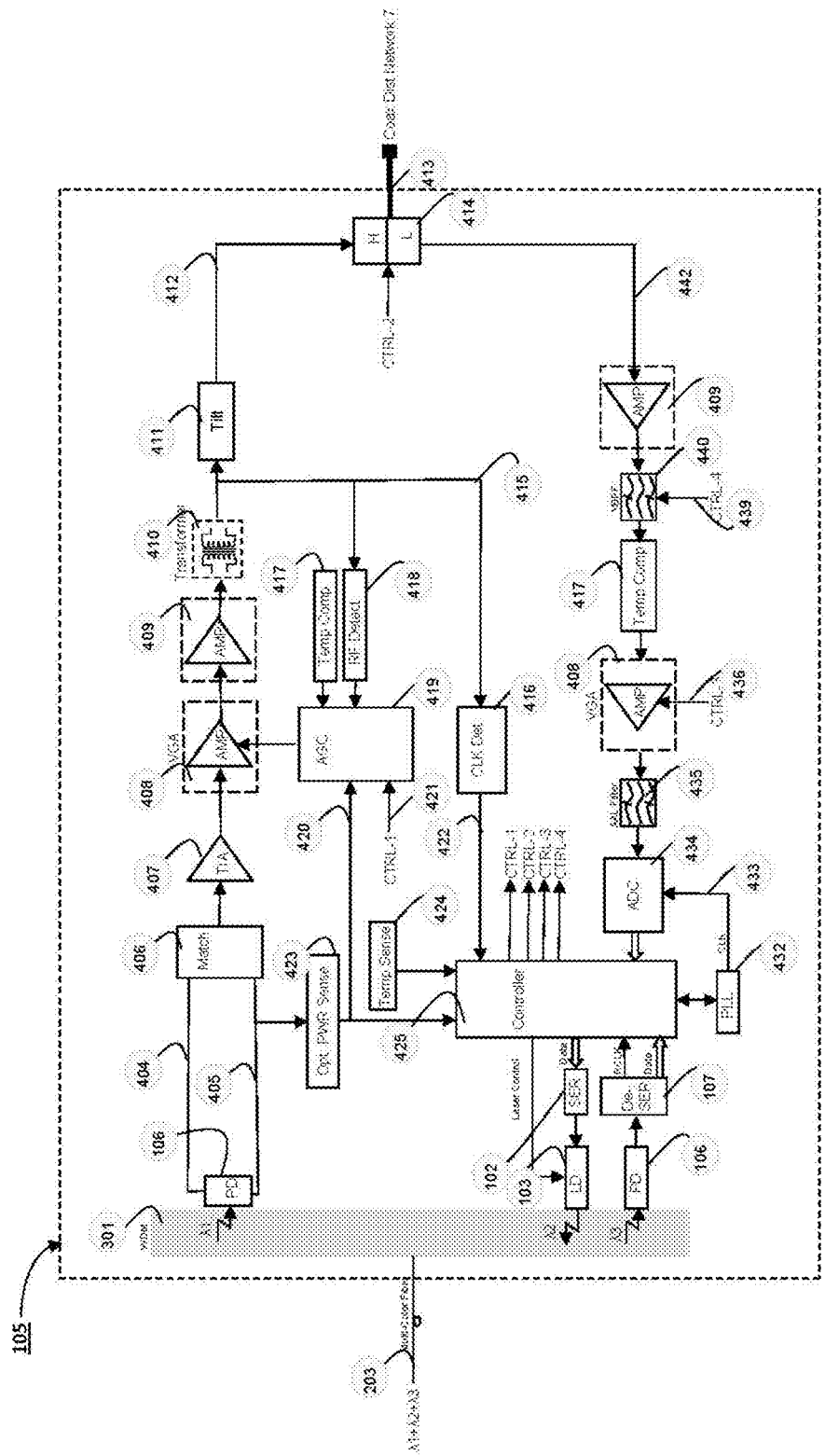
FIG. 12B illustrates a second exemplary embodiment of the DONU 105 according to the invention.
Figure 12C:
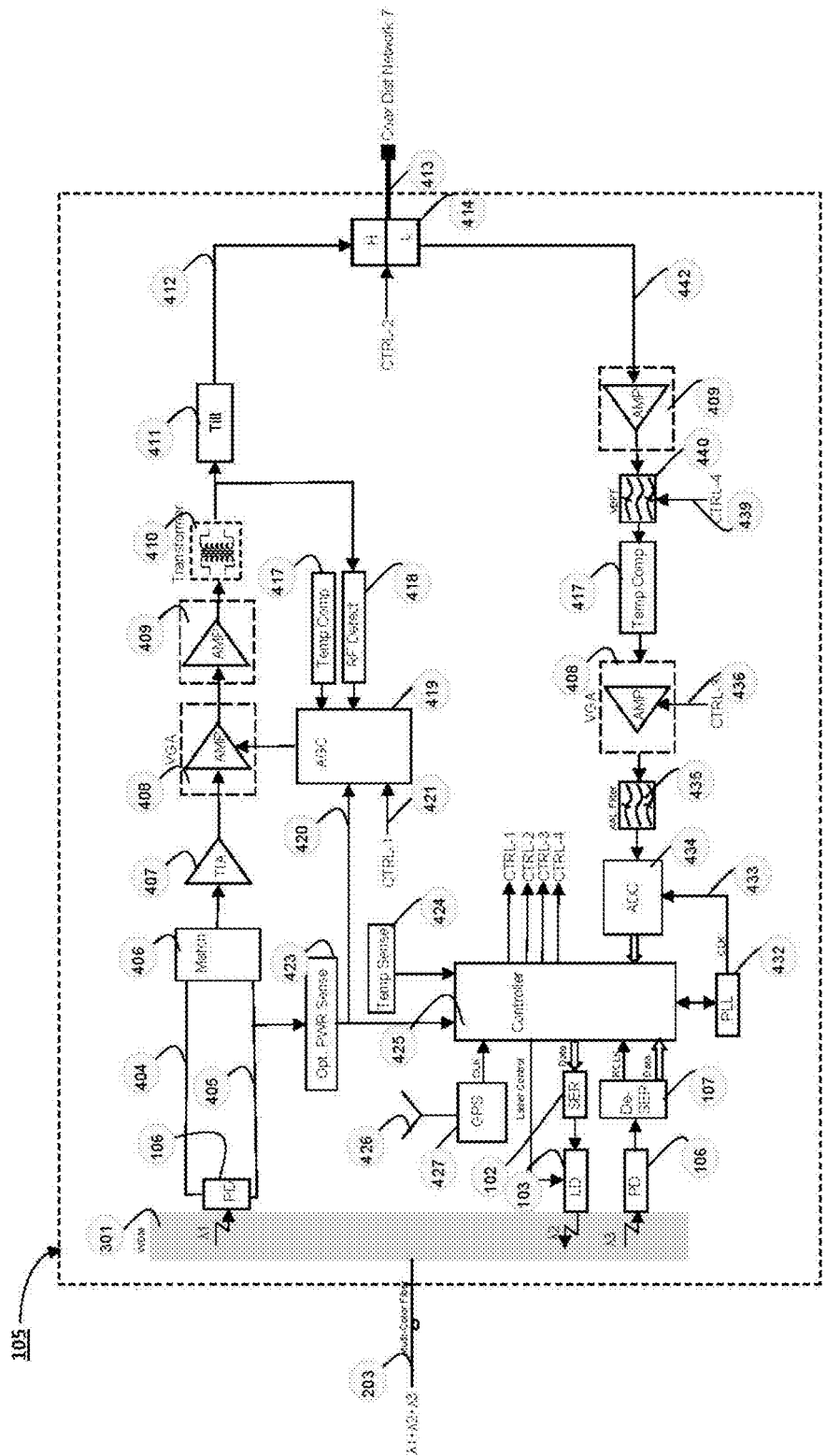
FIG. 12C illustrates a third exemplary embodiment of the DONU 105 according to the invention. In this embodiment, the source of synchronization is a clock source extracted from a GPS system.

FIGS. 12A-12C illustrate exemplary embodiments of the DONUs 105 according to the invention. FIG. 12A illustrates a first exemplary embodiment of the DONU 105 according to the invention. In this embodiment, the DONU 105 interfaces with the coax distribution network 7 through coax port 413. Diplexer 414 is a bidirectional frequency based multiplexer/demultiplexer. Coax cable 413 carries high frequency RF signals 412 toward the coax distribution network 7 and low frequency RF signals 442 from the coax distribution network 7 toward the DONU 105. The amplitude of the low frequency RF signal 442 is first amplified by amplifier 409 and then it is filtered by band pass filter 439. This process eliminates signals that are not in the desired band pass spectrum. Temperature compensation circuit 417 provides the needed adjustment to counter temperature related changes in the RF signal amplitude. Variable gain amplifier 408 is used to further increase the RF signal amplitude as needed. Anti-aliasing filter 435 restricts the RF signal bandwidth before it is sampled by analog to digital converter (ADC) 434. The ADC 434 samples the RF signal at rate of the sampling clock (CLK) 433. The digitized RF signal then is passed to controller 425 for transmission toward digital RFoG transceiver 101 via span 109.

Controller 425 receives high speed serial data and clock transmitted by the digital RFoG transceiver 101 via WDM 301, photo detector 106 and de-serializer 107. The data received from de-serializer 107 includes data to configure and control the on-board variable band-pass filter 439, variable gain amplifier 408, diplexer 414 and automatic gain control 419. De-serializer 107 also delivers a recovered clock (RCLK) to the controller 425. Controller 425 in turn adjusts phased locked loop (PLL) 432 and locks the sampling clock (CLK) 433 to the recovered clock (RCLK), thereby achieves synchronization of the DONU 105 to the digital RFoG transceiver 101. De-serializer 107 also delivers a frame signal that is embedded in the serial data stream.

ADC 434 data samples are received by controller 425, processed and sent toward Digital RFoG Transceiver 101 via serializer 102 and laser diode 103. The DONU controller 425 is described further below with reference to FIG. 13.

WDM 301 directs 2*d* toward photo detector 106. which is further processed by matching circuit 406 and trans-impedance amplifier 407. Optical power sense circuit 423 provides controller 425 and automatic gain control 419 with measurement data that indicates optical power at the input of photo detector 106. Automatic gain control 419 also receives ambient temperature data from temperature compensation circuit 417, and receives data indicating RF output power from RF power detect circuit 418. AGC 419 process the above mentioned data and controls the variable gain amplifier 408 to achieve a pre-configured constant RF power level. RF amplifier 409 amplifies the forward RF signal further, and a passive transformer 410 adapts the RF output to a single ended signal. Tilt pre-distortion circuit 411 changes the RF signal amplitude at each frequency to counter the uneven attenuation effects encountered on coax transmission medium.

Optionally, the diplexer 414 is tunable, where the frequency boundary between its high-frequency forward RF signal 412 and its low frequency upstream RF signal is adjusted by controller 425. This feature enables a single hardware platform to provide various upstream/downstream frequency split ratios. An example use of this feature is a network where a first DONU 105 can have a split ratio of 5 MHz-42 MHz for upstream RF and 54 MHz-1002 MHz for downstream RF, while a second DONU 105 in same network can have a split ratio of 5 MHz-85 MHz for upstream RF and 102 MHz-1002 MHz for downstream RF.

Optionally, the optical wavelength of laser diode 103 is tunable. Controller 425 configures the optical wavelength of the laser diode 103 through it tuning control signal 445. Having a tunable wavelength enables multiple large groups of DONUs 105 to use a single span to connect to digital RFoG transceiver 101.

FIG. 12B illustrates a second exemplary embodiment of the DONU 105 according to the invention. In this embodiment, the source of synchronization is a timing signal extracted from the forward feedback signal 415. Clock detector 416 extracts a timing signal that is present in the forward signal 415 and delivers the extracted clock also referred to as master clock 422 to the controller 425. Controller 425 locks PLL 432 to master clock 422, thereby synchronizing the sampling clock 433 to the original timing source present in the forward signal. This feature enables the plurality of DONUs 105 to be synchronized to a central timing source that is present in the forward signal.

FIG. 12C illustrates a third exemplary embodiment of the DONU 105 according to the invention. In this embodiment, the source of synchronization is a clock source extracted from a GPS system. GPS receiver 427 receives a GPS signal through an antenna 426, processes the GPS data, and extracts a GPS clock. Controller 425 locks the PLL 432 to the GPS clock, thereby synchronizing the sampling clock 433 to the GPS timing system.

Figure 13:
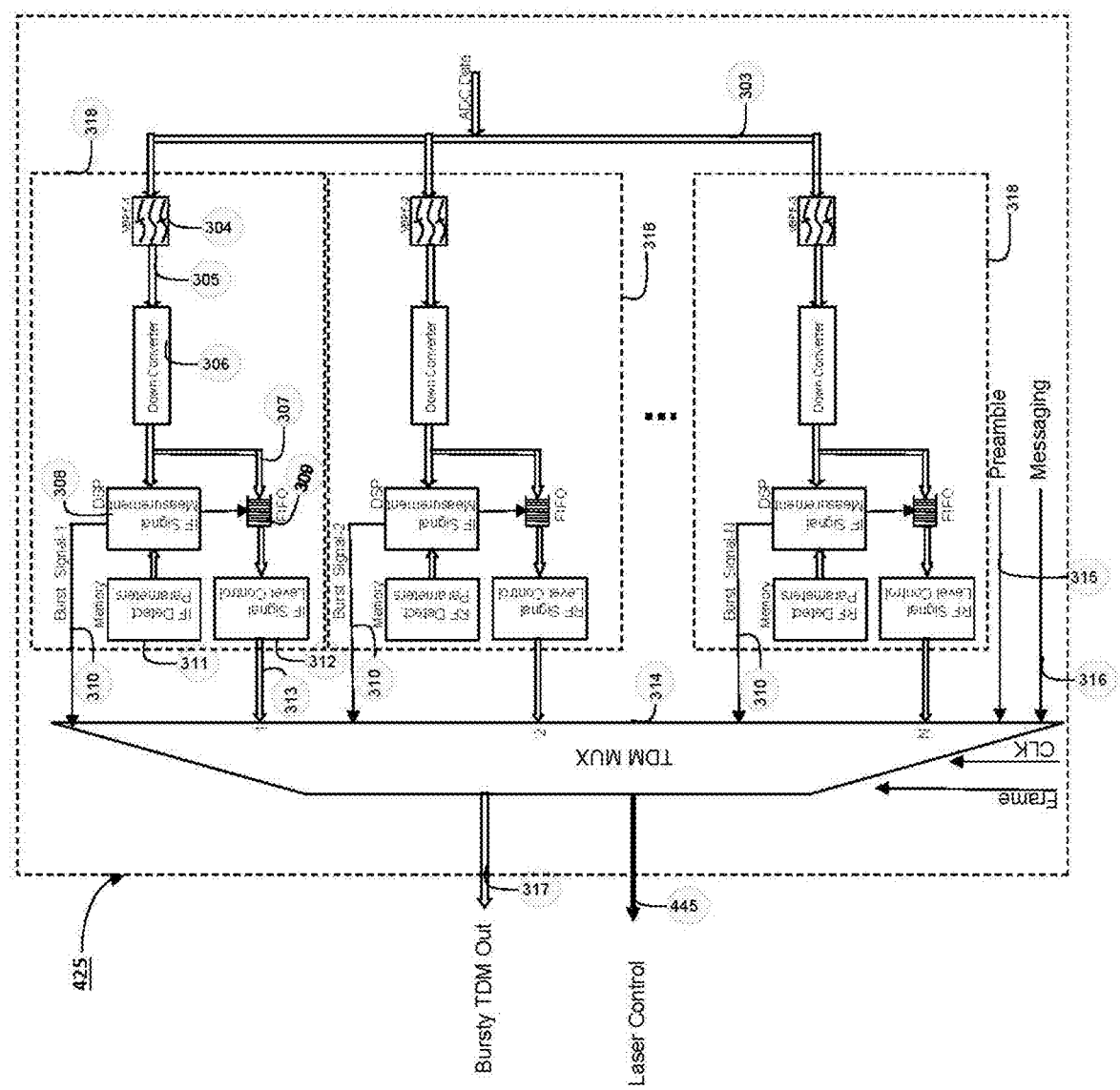
FIG. 13 illustrates an exemplary embodiment of the DONU controller 425 according to the invention.

FIG. 13 illustrates an exemplary embodiment of the DONU controller 425 according to the invention. IF burst processor 318 receives ADC digital data 303, processes the ADC digital data 303, and outputs IF digital burst data 313 and burst-on signal to TDM MUX 314. Variable band pass filter 304 filters ADC Digital Data 303 and outputs band limited digital RF data 305. Band pass filter 304 is preconfigured to a desired frequency band over which burst of RF data is expected. Down converter 306 down converts digital RF data 305 to an intermediate frequency (IF) indicated by IF digital data 307 bus.

IF digital data 307 bus is simultaneous processed by FIFO memory 309 and IF Signal Measurement DSP 308. IF signal detect parameters 311 is pre-configured with parameters that include, but are not limited to, any combination of the following:

Minimum & maximum IF burst duration;
IF burst power thresholds & hysteresis levels in absolute values as well as relative to average IF signal power;
list of in-band frequencies;
list of out-of-band frequencies;
IF burst ram-up & ramp-down profiles (amplitude versus time); and
IF Burst Negative delay.

IF signal measurement DSP 308 performs continues processing on the digitized IF data, compares measured parameters against stored parameters provided by IF detect parameter memory 311 and outputs control signals for FIFO 309.

The output of FIFO 309 is further processed by IF signal level control 312, adjusting the power of the IF signal based on parameters received through a control bus. IF signal level control 312 enables adjustment of IF signal per each connected DONU. This capability can be used to achieve uniform RF signal levels in large systems, enabling or disabling service to a single or group of DONUs 105, and/or help identify a specific DONU 105 that may be contributing undesirable ingress noise into the system.

IF signal measurement processor 308 processes the digital values of IF power level and compares the measured results with pre-configured values for valid burst ramp up profile, valid IF burst ramp down profile, IF burst power threshold values, hysteresis values, minimum valid IF burst duration, and maximum valid burst duration. Once the IF signal measurement processor 308 detects a valid IF burst, the processor 308 compensates for time delay that resulted from the various IF burst processing stages and adjusts the FIFO pointer control bus to point to FIFO memory location where the actual start of the IF burst is stored. IF signal measurement processor 308 further adjust the FIFO pointer to account for the start of IF burst portion that is below the detection threshold and has been pre-configured as a start of RF burst negative delay. By adjusting the FIFO pointer with these two parameters the system eliminates any loss of IF burst data that is used to transmit preamble information.

Several burst processors 318 are connected to a single TDM multiplexer 314, each processing a different frequency band. TDM MUX 314 receives multiple burst-on signals 310 and their respective digital IF burst data 313 buses, time multiplexes the IF data, and serializes the resulting data. TDM MUX 314 sends out serial preamble sequence followed by the bursty TDM out data 317 together with laser control 445, which turns-on laser 103 (see FIGS. 12A-12C), enabling transmission of RF burst data toward digital RFoG transceiver 101.

Figure 14A:
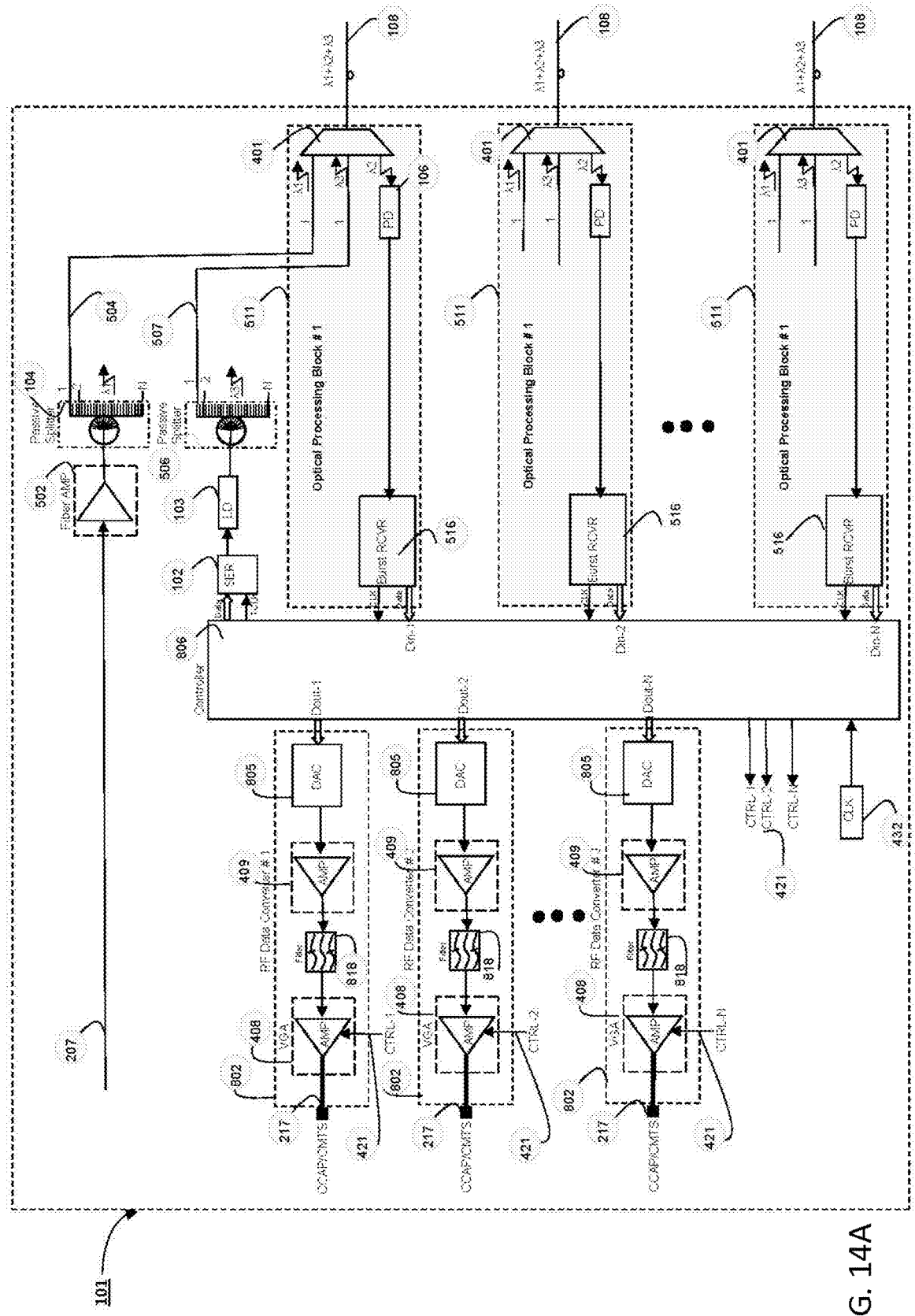
FIG. 14A illustrates a first exemplary embodiment of the digital RFoG transceiver 101 according to the invention.

FIGS. 14A, 14B, 14C, and 15 illustrate exemplary embodiments of the digital RFoG transceiver 101 according to the invention. FIG. 14A illustrates a first exemplary embodiment of the digital RFoG transceiver 101 according to the invention. In this embodiment, a WDM MUX/de-MUX 401 terminates digital fiber link 108, which carries the RF optical forward signal 504, digital optical forward signal 507, and digital upstream signal. Aggregated digital upstream data carried over wavelength λ2 is received by photo diode 106, converted to digital data stream, and handed over to burst receiver 516. Burst receiver 516 then locks to the incoming data bursts, converts the burst serial format data into a parallel format data, and provides the controller 806 with clock and data signals. The Digital RFoG Transceiver controller 806 further processes the received data and outputs the processed data to digital to analog converter (DAC) 805. The DAC 805 converts the processed data into analog RF format. RF amplifier 409 amplifies the amplitude of the analog RF signal and passes the analog RF signal through RF filter to remove unwanted RF spectrum that resulted from the analog to digital & digital to analog conversion processes. Variable RF amplifier 408 amplifies the RF output 217 to a level that is controlled by signal CTRL-1.

The digital RFoG transceiver controller 806 performs the following digital signal processing prior to handing off the data to the on-board DAC 805:

Extract IF data from bursty TDM input;
Up convert each extracted IF data to appropriate frequency; and
Sum all up converted RF to a single digital RF data, reconstructing analog RF signal that was first sampled by DONU 105

Digital RFoG Transceiver controller 806 transmits its control data and its transmit clock to serializer 102. The serializer 102 converts the data into a serial format with a rate defined by the digital RFoG Transceiver controller 806 transmit clock signal (TCLK). The serial data from serializer 102 is converted to WDM λ3 by laser diode 103. Optical passive splitter 506 then performs power splitting of the WDM serial data, resulting in multiple digital forward signals 507. Digital forward signal 507 is used by the plurality of connected DONUs 105 as a source for management data, configuration data, and clock & frame synchronization.

In addition, digital RFoG transceiver controller 806 performs the following tasks:

Transmits ranging request to each connected DONU 105 periodically;
Receives ranging replies from DONU 105;
Send ranging adjustment data to connected DONU 105;
Transmits status update request to each connected DONU 105 periodically; and
Receives status data from connected DONU 105 and sends data to external management server.

Optionally, the digital RFoG transceiver 101 includes multiple optical receivers 511 and multiple RF data converters 802. Each performs the functions as set forth above.

Figure 14B:
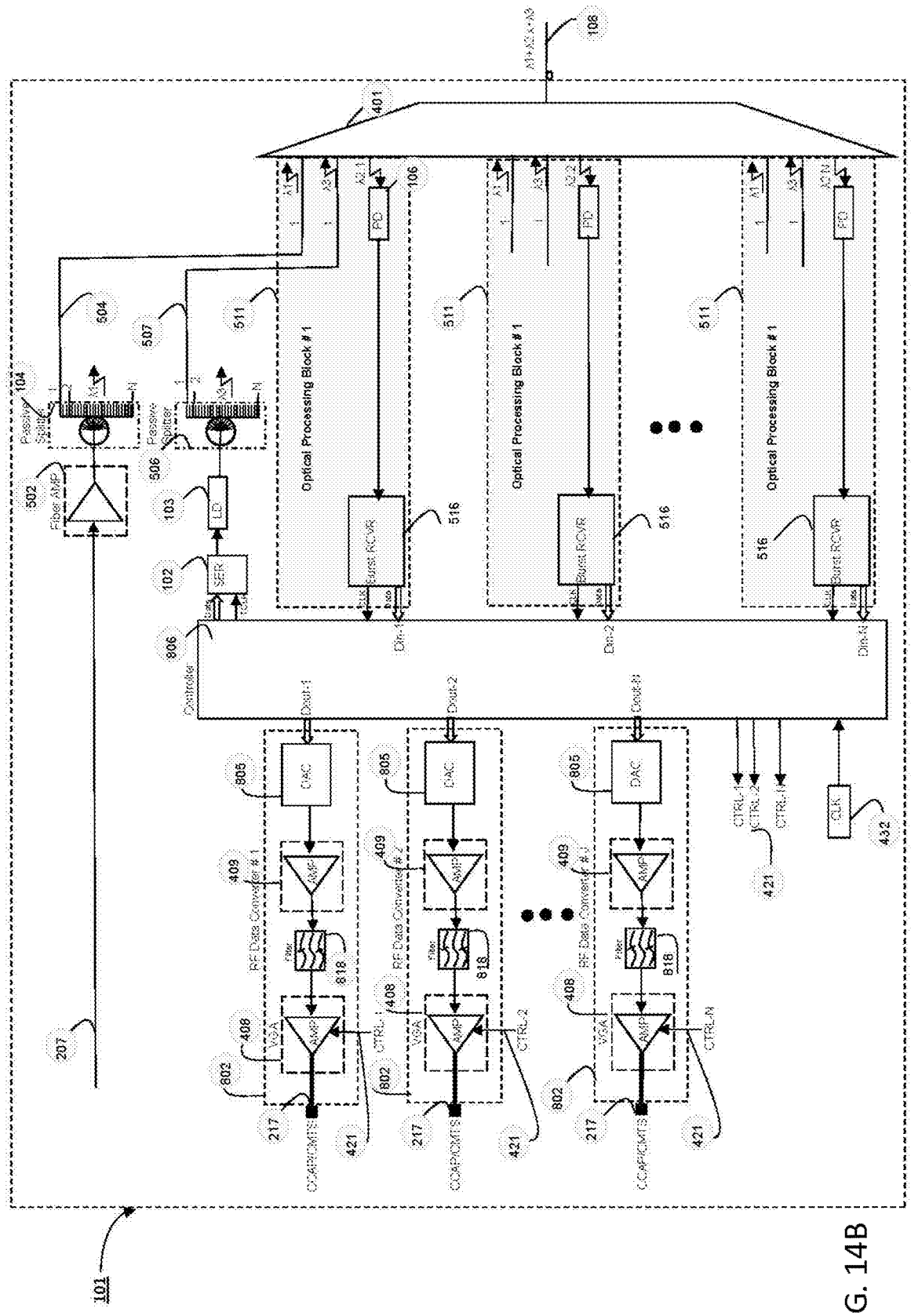
FIG. 14B illustrates a second exemplary embodiment of the digital RFoG transceiver according to the invention.

FIG. 14B illustrates a second exemplary embodiment of the digital RFoG transceiver 101 according to the invention. This embodiment of the digital RFoG transceiver 101 may be used with the system described above with reference to FIG. 10B. According to this embodiment, WDM multiplexer/de-multiplexer 401 terminates digital fiber trunk 108, which carries multiple wavelength in two directions. Digital fiber trunk 108 in the forward direction (toward connected DONUs 105) carries RF optical forward signal 504 using wavelength λ1 and digital optical forward signal 507 using wavelength λ3. In the upstream direction (from DONUs 105 toward digital RFoG transceiver 101), digital fiber trunk 108 carries multiple digital upstream signals using wavelengths λ2.1 through λ2.x. WDM multiplexer/de-multiplexer 401 then de-multiplexes wavelengths λ2.1 through λ2.x and delivers the segregated signals to their respective optical port receiver 511. The remaining components of this embodiment of the transceiver 101 performs the functions as described above with referenced to FIG. 14A.

Figure 14C:
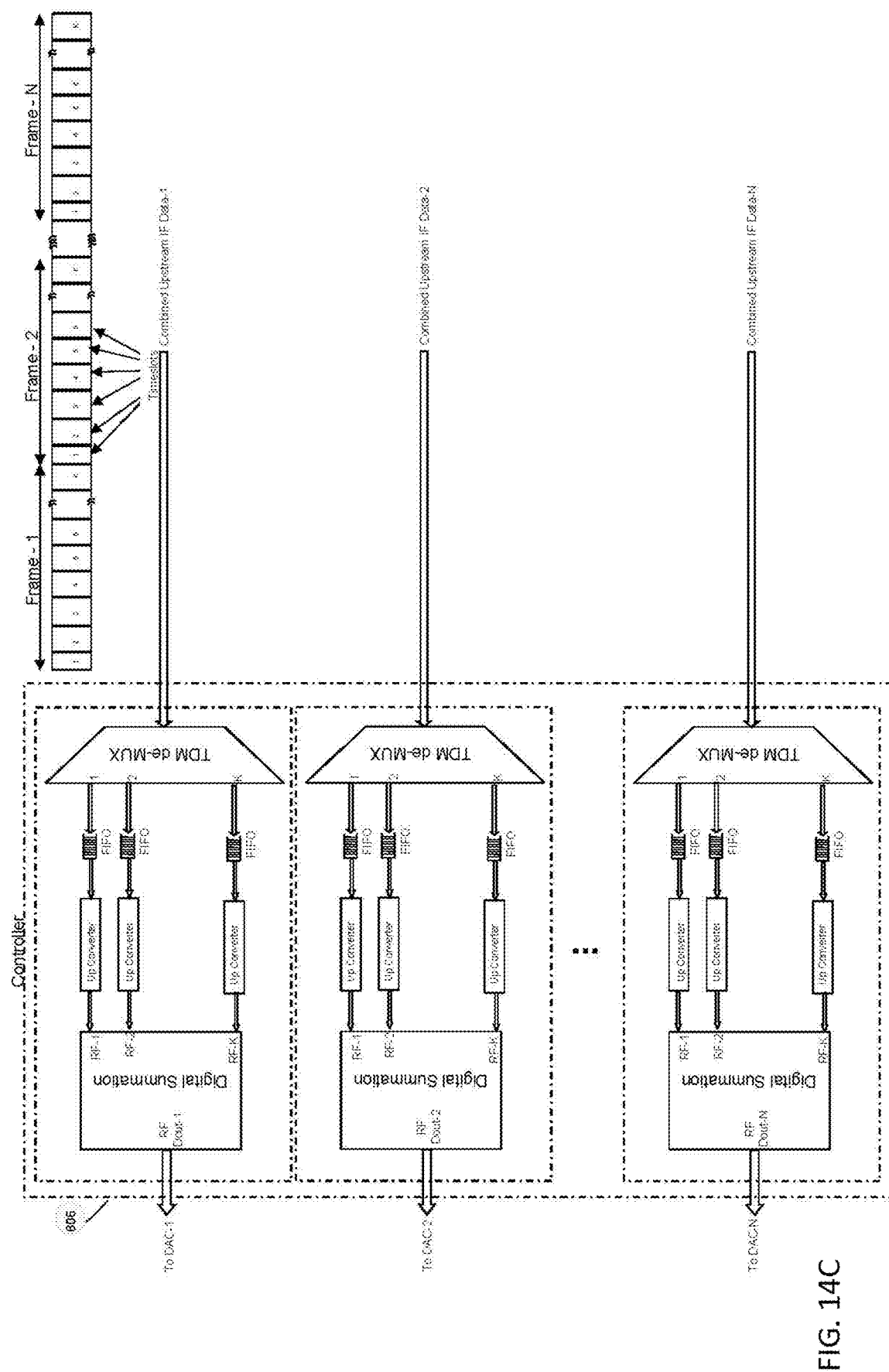
FIG. 14C illustrates the performance of digital signal processing by the first or second exemplary embodiments of the digital RFoG transceiver according to the invention.

FIG. 14C illustrates the performance of digital signal processing by the first or second exemplary embodiments of the digital RFoG transceiver according to the invention. The digital RFoG transceiver controller 806, as illustrated in FIG. 14C, performs the following digital signal processing prior to handing off the data to the on-board DAC 805:

extract a plurality of IF data from bursty TDM input;
stores a plurality of recovered IF data in related FIFO memories;
up converts each extracted IF data to an appropriate radio frequency; and
sums the up converted RF to a single digital RF data, thus reconstructing the analog RF signal that was first sampled by the plurality of DONUs 105.

Figure 15:
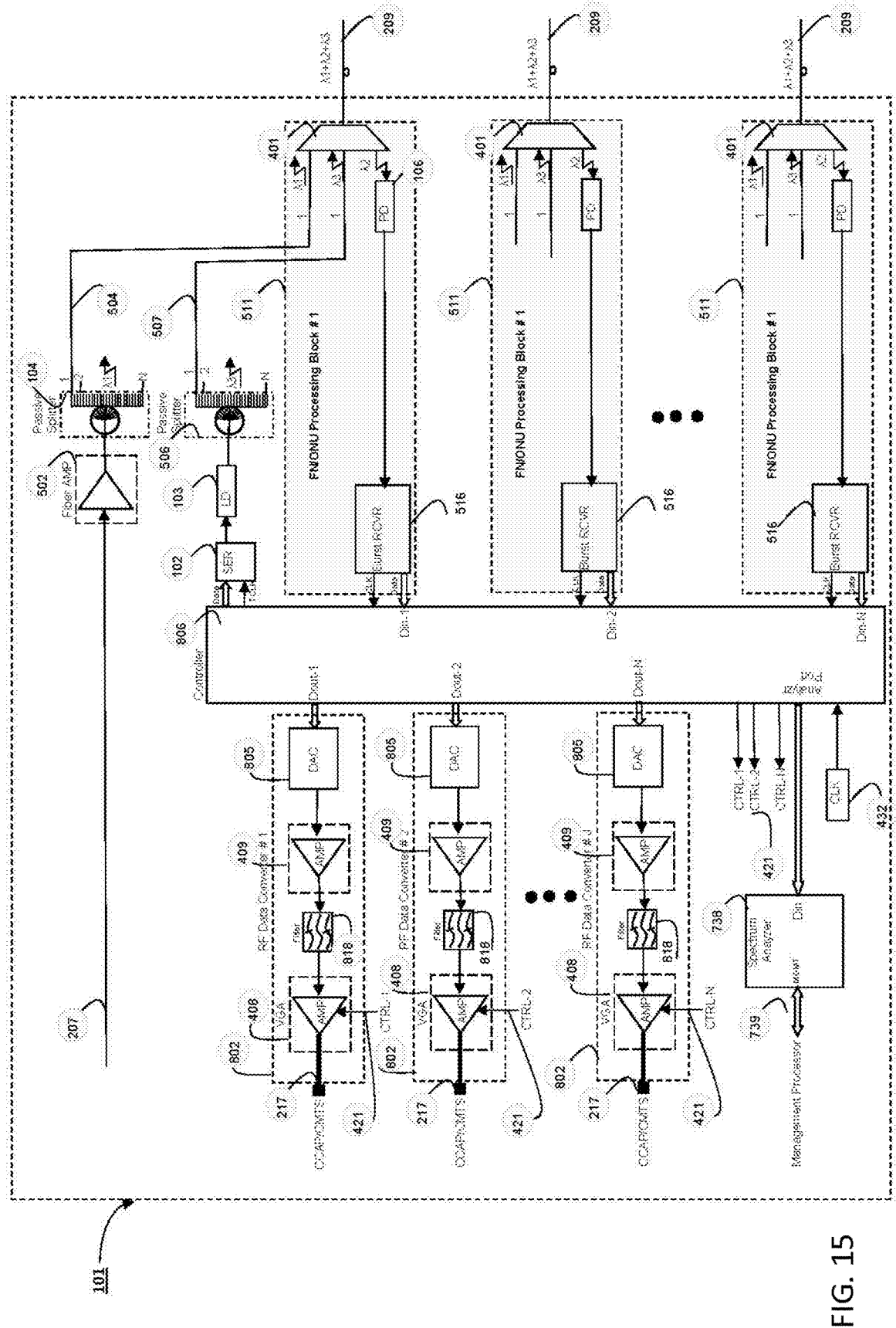
FIG. 15 illustrates a third exemplary embodiment of the digital RFoG transceiver 101 according to the invention.

FIG. 15 illustrates a third exemplary embodiment of the digital RFoG transceiver 101 according to the invention. In this embodiment, in addition to the components as described above with reference to FIG. 14A, a spectrum analyzer 738 is receiving digitized RF samples from any of the selected input ports. An external management server (not shown) configures the digital RFoG transceiver controller 806 and forwards digital samples from one of its input port associated with the selected DONU 105 to be analyzed. The digital RFoG transceiver controller 806 then sends data samples from its selected input port to a number of output ports (multicast), including the output port connecting to RF data converter 802, and to the spectrum analyzer 738. The spectrum analyzer 738 then processes the digital RF data and sends the external management server data that includes tables of RF signal amplitude at each selected frequency band. The external management server configures various parameters controlling the operation of the spectrum analyzer 738. These parameters include variables such as frequency band, center frequency, video bandwidth, IF bandwidth, scan rate, scan bandwidth, RF attenuator and IF gain reference level.

The external management server may employ the spectrum analyzer 738 in a manual mode or on an automatic mode. In manual mode, the spectrum analyzer 738 and digital RFoG transceiver controller 806 are configured to scan data from a single selected RF port. In automatic mode, the spectrum analyzer 738 and digital RFoG transceiver controller 806 are configured to scan upstream data from all RF ports, such as one at a time in round robin fashion. The data collected during the "automatic" mode is stored by external management server for analysis at a later time.

The data collected from spectrum analyzer 738 then can be used to adjust RF signal gain stages at each DONU 105, thus achieving uniform RF signal levels across a large system. The same data can be used to identify sources of ingress noise, which can be remedied by adjusting the bandpass filters at the DONUs 105.

Embodiments of a system for digital aggregation of upstream traffic according to the invention has been described. The various embodiments of the invention address the problems and disadvantages of existing daisy chaining techniques as follows.

Complicated Management. As illustrated in at least FIGS. 10A and 10B, each DONU 105 communicates with the digital RFoG transceiver 101 using spans 109 bidirectionally. This arrangement provides a straightforward way for the digital RFoG transceiver 101 to communicate with each connected DONU 105, detect their presence, send commands to the DONU 105, and receive status information from the DONUs 105.

The various embodiments of the invention address the problems and disadvantages of existing RFoG techniques as follows.

Loss of Preamble. As illustrated in at least FIG. 13, digital samples representing upstream RF data samples are stored in FIFO 309, while IF signal measurement DSP 308 continuously processes the incoming samples. Upon detection of a valid IF burst, IF signal measurement DSP 308 compensates for time delay that resulted from the various IF burst processing stages and adjusts the FIFO pointer control bus to point to FIFO memory location where the actual start of the IF burst is stored. The IF signal measurement DSP 308 further adjusts the FIFO pointer to account for the start of the IF burst portion that is below a detection threshold and has been pre-configured as a start of the RF burst negative delay. By adjusting the FIFO pointer with these two parameters, the system eliminates any loss of IF burst data that is used to transmit preamble information.

Limited Number of Optical Nodes. As illustrated in at least FIGS. 10A-10B12C, the DONU 105 communicate with the digital RFoG transceiver 101 bidirectionally over optical spans using a digital protocol. Since the DONU 105 communication with the digital RFoG transceiver 101 are bursty digital. The lasers in the DONU 105 are modulated according to digital protocols and therefore the "off state" does not have any effect on the RF sample noise floor.

Upstream Link Performance. As illustrated in at least FIGS. 10A-10B, the communications between the DONU 105 and the digital RFoG transceiver 101 are digital. Upstream RF samples traversing the optical fiber link between the digital RFoG transceiver 101 and the DONU 105 are organized into digital bit streams that are easily received and stored by the digital RFoG transceiver 110 input ports. As opposed to AM modulated analog optical links, digital optical links have much higher tolerance for link parameter variations as a results of temperature changes, link distances variations or laser analog performance.

Optical Beating Interference. As illustrated in at least FIGS. 10A-10B, the DONU 105 communicate with the digital RFoG transceiver 101 bidirectionally over optical spans using digital TDM protocol. Thus, there is no opportunity for the optical signals from different optical nodes to interfere with each other.

Lack of Management Facilities. As illustrated in at least FIGS. 10A-10B, the DONU 105 communicate with the digital RFoG transceiver 110 bidirectionally over optical spans using a digital protocol. Every DONU 105 directly communicates with the digital RFoG transceiver 101 bidirectionally. This allows a straightforward way for the digital RFoG transceiver 101 to communicates directly with each connected DONU 105, detect the presence of each DONU 105, send commands to the DONU 105 directly, and receive status information from the DONU 105 directly. Communication channels are allocated between the DONU 105 and the digital RFoG transceiver 101 to facilitate the transmission of commands, configurations and parameters, and status information bidirectionally.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for digital aggregation of upstream traffic in a network, comprising:
 a plurality of digital optical node units coupled to a customer distribution network comprising a plurality of cable modems, wherein the plurality of cable modems does not simultaneously burst data on a same frequency band, wherein each frequency band is assigned a corresponding timeslot for transmission of digital data;
 a plurality of optical fiber spans, each optical fiber span coupled to a corresponding digital optical node unit of the plurality of digital optical node units, wherein each given digital optical node unit:
  receives a radio frequency (RF) data from the customer distribution network;
  digitizes the RF data;
  converts, by an optical node controller at the given digital optical node unit, the digitized RF data to intermediate frequency (IF) digital burst data; and
  outputs a burst-on signal by the optical node controller to a time division multiplexer (TDM) at the given digital optical node unit;
  upon detecting the burst-on signal, transmits, by the TDM, the IF digital burst data onto the optical fiber span coupled to the given digital optical node unit at the corresponding timeslot assigned to the frequency band of the IF digital burst data;
 an optical passive splitter, wherein the plurality of digital optical node units are directly coupled in parallel to the optical passive splitter via the plurality of optical fiber spans, wherein the optical passive splitter:
  receives the IF digital burst data from each digital optical node unit of the plurality of digital optical node units over each optical fiber span coupled to each digital optical node unit at the corresponding timeslots assigned to the frequency band of the IF digital data from each digital optical node unit;
  combines the IF digital burst data from each digital optical node unit into a combined digital data; and
  sends the combined digital data to a digital radio frequency over glass (RFoG) transceiver over a single span;
 the digital RFoG transceiver coupled to the single span, wherein the digital RFoG transceiver:
  receives the combined digital data from the optical passive splitter, wherein the IF digital burst data in the combined digital data from the given digital optical node unit is received without collision with IF digital burst data in the combined digital data from other digital optical node units;
  converts the combined digital data to combined analog RF data; and
  outputs the combined analog RF data to the network.

2. The system of claim 1, wherein each of the plurality of digital optical node units is further assigned a corresponding wavelength for the transmission of the digital data.

3. The system of claim 1, wherein the single span comprises a single bidirectional wavelength division multiplexing (WDM) access fiber coupled to the optical passive splitter and the RFoG transceiver.

4. The system of claim 1, further comprising a wavelength division multiplexer and de-multiplexer (WDM Mux/De-Mux) coupled to the optical passive splitter via a single WDM access fiber and to the digital RFoG transceiver.

5. The system of claim 1, wherein the RFoG transceiver further:
- periodically sends a ranging request message to each of the plurality of digital optical node units;
- measures and processes a round trip delay (RTD) for each of the plurality of digital optical node units; and
- transmits a frame position correction to each of the plurality of digital optical node units based on the RTD for each corresponding digital optical node unit.

6. The system of claim 1, wherein each given digital optical node unit further:
- filters, by a band pass filter of the optical node controller at the given digital optical node unit, the digitized RF data, the band pass filter configured to a given frequency band for the RF data; and
- converts, by the optical node controller, the filtered digitized RF data to the IF digital burst data.

7. The system of claim 1, wherein the IF digital burst data is stored in a first-in-first-out (FIFO) memory, wherein upon detecting the burst-on signal, each given digital optical node unit further:
- adjusts a FIFO pointer to point to a FIFO memory location where an actual start of the IF digital burst data is stored.

8. The system of claim 7, wherein each given digital optical node unit further:
- further adjusts the FIFO pointer to account for a start of a portion of the IF burst data that is below a detection threshold and configured as a start of an RF burst negative delay.

* * * * *